US009451327B2

(12) United States Patent
Sugimoto et al.

(10) Patent No.: US 9,451,327 B2
(45) Date of Patent: Sep. 20, 2016

(54) COMMUNICATIONS SYSTEM AND METHOD, INFORMATION PROCESSING APPARATUS AND METHOD, INFORMATION MANAGEMENT APPARATUS AND METHOD, RECORDING MEDIUM AND PROGRAM

(71) Applicant: Sony Corporation, Tokyo (JP)

(72) Inventors: Kayo Sugimoto, Tokyo (JP); Kazuyuki Ogawa, Kanagawa (JP); Yuji Takimoto, Kanagawa (JP); Makoto Sato, Tokyo (JP)

(73) Assignee: Sony Corporation (JP)

( * ) Notice: Subject to any disclaimer, the term of this patent is extended or adjusted under 35 U.S.C. 154(b) by 209 days.

(21) Appl. No.: 14/134,159

(22) Filed: Dec. 19, 2013

(65) Prior Publication Data

US 2014/0109130 A1     Apr. 17, 2014

Related U.S. Application Data

(63) Continuation of application No. 13/888,665, filed on May 7, 2013, which is a continuation of application No. 10/542,221, filed as application No. PCT/JP03/15648 on Dec. 8, 2003, now Pat. No. 8,463,917.

(30) Foreign Application Priority Data

Jan. 24, 2003   (JP) .............. P2003-015568

(51) Int. Cl.
*G06F 15/16*     (2006.01)
*H04N 21/472*    (2011.01)
(Continued)

(52) U.S. Cl.
CPC ...... *H04N 21/47217* (2013.01); *H04L 65/602* (2013.01); *H04N 7/17318* (2013.01);
(Continued)

(58) Field of Classification Search
CPC ................... H04L 65/602; H04N 21/6437
USPC ................................... 709/227–229
See application file for complete search history.

(56) References Cited

U.S. PATENT DOCUMENTS 5,661,665 A * 8/1997 Glass ................ H04N 21/4341
                                                   348/390.1
6,064,380 A    5/2000 Swenson et al.
(Continued)

FOREIGN PATENT DOCUMENTS

JP    2002-044586 A    2/2002
JP    2002-112201 A    4/2002
(Continued)

OTHER PUBLICATIONS

European Search Report, EP 03777334, dated Mar. 19, 2009.

*Primary Examiner* — Hieu Hoang
(74) *Attorney, Agent, or Firm* — Lerner, David, Littenberg, Krumholz & Mentlik, LLP

(57) ABSTRACT

A communications system and method, an information processing apparatus and method, an information management apparatus and method, a recording medium and a program make it possible to efficiently and comfortably make use of contents, which are stored in one server, from a plurality of devices connected via a network. In a case in which the playing of content is stopped, bookmark information including a time stamp representing the stopped position of the content is stored in association with predetermined identification information. The bookmark information is available for various apparatuses transmitting the identification information. When playing the content from a position designated by the information from a predetermined apparatus, the time stamp included in the bookmark information is referred to and the playing of the content from the stopped position is started. The present invention can be applied to various apparatuses such as a personal computer, audio equipment, a PDA, a mobile phone and the like.

12 Claims, 19 Drawing Sheets

(51) Int. Cl.
  *H04L 29/06* (2006.01)
  *H04N 21/6437* (2011.01)
  *H04N 7/173* (2011.01)
  *H04N 21/231* (2011.01)
  *H04N 21/6587* (2011.01)
  *H04N 21/845* (2011.01)

(52) U.S. Cl.
  CPC .... *H04N21/23106* (2013.01); *H04N 21/6437* (2013.01); *H04N 21/6587* (2013.01); *H04N 21/8455* (2013.01)

(56) References Cited

U.S. PATENT DOCUMENTS

| | | |
|---|---|---|
| 6,868,225 B1 | 3/2005 | Brown et al. |
| 7,484,234 B1 | 1/2009 | Heaton et al. |
| 7,539,127 B1 * | 5/2009 | Shaffer ............... H04L 65/1083 370/216 |
| 2001/0027451 A1 | 10/2001 | Taguchi et al. |
| 2002/0040475 A1 | 4/2002 | Yap et al. |
| 2002/0059425 A1 * | 5/2002 | Belfiore .................... G06F 9/54 709/226 |
| 2002/0133247 A1 * | 9/2002 | Smith .................... H04L 29/06 700/94 |
| 2003/0055977 A1 * | 3/2003 | Miller .................... H04L 29/06 709/227 |
| 2003/0073432 A1 * | 4/2003 | Meade, II ............. G08C 17/02 455/420 |
| 2003/0097446 A1 | 5/2003 | Takahashi et al. |
| 2003/0122966 A1 | 7/2003 | Markman et al. |

FOREIGN PATENT DOCUMENTS

| | | |
|---|---|---|
| JP | 2002-196996 A | 7/2002 |
| JP | 2002-281569 A | 9/2002 |
| WO | 98/48566 | 10/1998 |
| WO | 00/58967 | 10/2000 |
| WO | 02/102079 | 12/2002 |

* cited by examiner

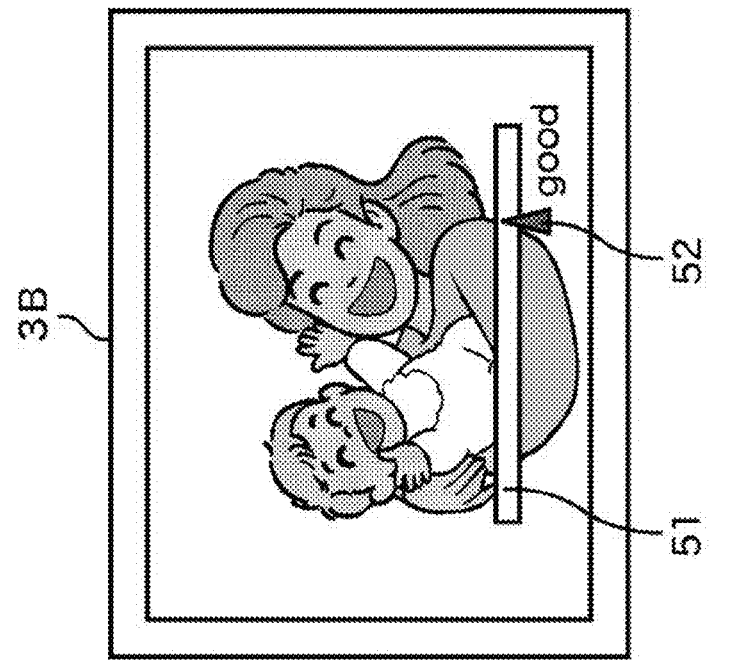
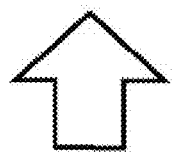
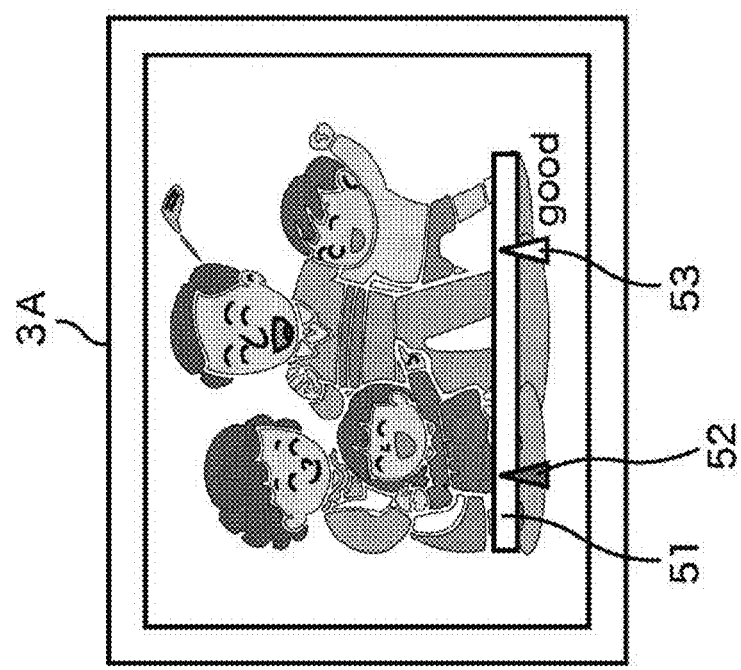
FIG. 4

FIG. 7

| BOOKMARK No. | 001 |
|---|---|
| CONTENT ID | 7777777 |
| ACCESS RIGHT : USER ID | AUTHORIZED : 123456 |
| ACCESS RIGHT : USER GROUP ID | UNAUTHORIZED : xxxxxx |
| ACCESS RIGHT : CLIENT DEVICE ID | UNAUTHORIZED : yyyyyy |
| POINTER TYPE : TIME STAMP VALUE | PLAY START : 0H12M34S |
| POINTER TYPE : TIME STAMP VALUE | PLAY END : WITHOUT DESIGNATION (TO THE END) |
| ⋮ | ⋮ |

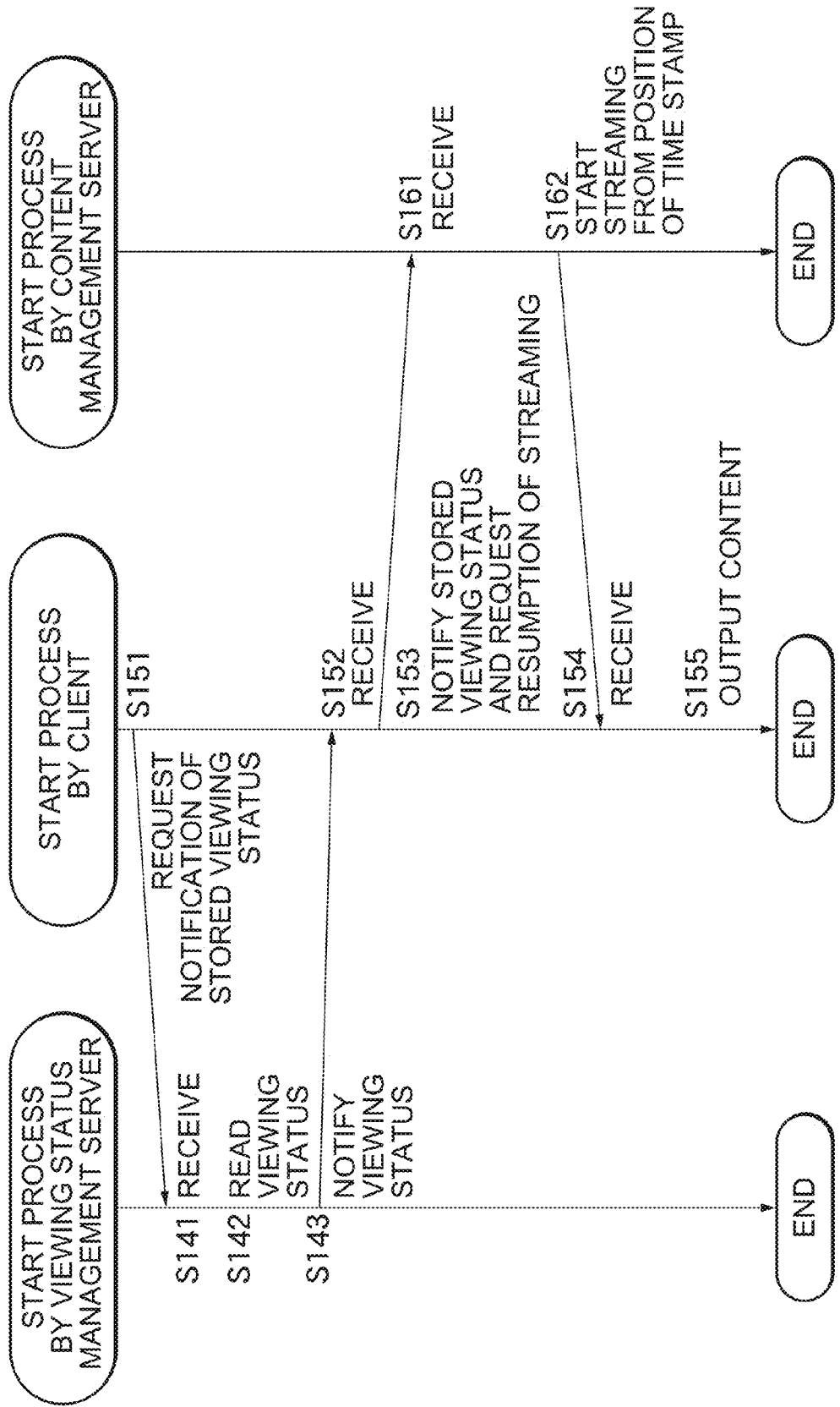

COMMUNICATIONS SYSTEM AND
METHOD, INFORMATION PROCESSING
APPARATUS AND METHOD, INFORMATION
MANAGEMENT APPARATUS AND METHOD,
RECORDING MEDIUM AND PROGRAM

CROSS-REFERENCE TO RELATED
APPLICATIONS

The present application is a continuation of U.S. patent application Ser. No. 13/888,665, filed on May 7, 2013, which is a continuation of U.S. patent application Ser. No. 10/542,221 filed on Mar. 6, 2006, which application is a national phase entry under 35 U.S.C. §371 of International Application No. PCT/JP2003/015648 filed Dec. 8, 2003, which claims priority from Japanese Patent Application No. P2003/015568 filed Jan. 24, 2003, all of which are incorporated herein by reference.

BACKGROUND OF THE INVENTION

The present invention relates to a communications system and method, an information processing apparatus and method, an information management apparatus and method, a recording medium and a program, and in particular relates to a communications system and method, an information processing apparatus and method, an information management apparatus and method, a recording medium and a program that make it possible to efficiently and comfortably make use of contents, which are stored in one server, from a plurality of devices connected via a network.

In recent years, high-capacity hard disks and DVD (Digital Versatile Disc) recorder drives have become relatively less expensive, and viewing television programs and the like using AV (Audio Visual) devices equipped with such devices is becoming popular.

In addition, even while viewing a television program or the like using such a device, in order to make it possible to stop viewing the television program and later resume viewing, a technology is disclosed in Japanese Unexamined Patent Application Publication No. 2002-44586, mentioned below, where information representing stopped positions is listed and managed in association with identification information of television program data.

However, with the technology disclosed in Japanese Unexamined Patent Application Publication No. 2002-44586, there is a problem in that the listed and managed information representing stopped positions is available only to the device that set it, and cannot be used by other devices.

SUMMARY OF THE INVENTION

The present invention is made in view of such circumstances, and makes it possible to make use of contents stored in one server more efficiently and comfortably from a plurality of devices connected via a network.

An information processing apparatus of a communications system of the present invention includes playing means for playing content provided from an information management apparatus via a network; first request means for requesting that the information management apparatus store a time stamp in association with predetermined identification information, while the content is played by the playing means, in response to an instruction that the time stamp representing a playing position of the content at that moment be stored; and second request means for transmitting the identification information to the information management apparatus and for requesting the playing of the content from the playing position represented by the time stamp, wherein the identification information includes information allotted to each user and information allotted to each user group, and the playing means is operable to play the content from the playing position represented by the time stamp in accordance with the request by the second request means. In addition, the information management apparatus of the communications system of the present invention includes providing means for providing the content to the information processing apparatus via the network; and storing means for storing the time stamp in association with the identification information, wherein the providing means is operable to provide the content from the playing position represented by the time stamp when the information processing apparatus transmits the identification information and requests the playing of the content from the playing position represented by the time stamp.

A communication method of a communications system of the present invention includes playing content provided from an information management apparatus via a network; requesting that the information management apparatus store a time stamp in association with predetermined identification information during the playing step in response to an instruction to store the time stamp representing a playing position of the content at that moment; transmitting the identification information to the information management apparatus and requesting the playing of the content from the playing position represented by the time stamp, the identification information including information allotted to each user and information allotted to each user group, and the playing step plays the content from the playing position represented by the time stamp in accordance with the step of requesting the playing. In addition, the communication method of the communications system of the present invention includes storing the time stamp in association with the identification information; and providing the content to an information processing apparatus via the network from the playing position represented by the time stamp when the transmitting step transmits the identification information and the step of requesting the playing requests the playing of the content from the playing position represented by the time stamp.

An information processing apparatus of the present invention includes playing means for playing content provided via a network from an information management apparatus that manages the content; first request means for requesting that the information management apparatus store a time stamp in association with predetermined identification information, while the content is played by the playing means, in response to an instruction to store the time stamp representing a playing position of the content at that moment; and second request means for transmitting the identification information to the information management apparatus and for requesting the playing of the content from the playing position represented by the time stamp, wherein the identification information includes information allotted to each user and information allotted to each user group, and the playing means is operable to play the content from the playing position represented by the time stamp in accordance with the request by the second request means.

In a case where an instruction to store a time stamp is given at the same time as an instruction to stop the playing of the content, the first request means may request that the information management apparatus stop providing the content as well as store the time stamp.

An information processing apparatus of the present invention may further include third request means for requesting that a viewing status information management apparatus that manages viewing status information store viewing status information representing a viewing status of the content. In this case, the second request means is operable to request the playing of the content from the playing position represented by the time stamp in accordance with the viewing status of the content represented by the viewing status information.

An information processing method of an information processing apparatus of the present invention includes playing content provided via a network from an information management apparatus that manages content; requesting that the information management apparatus store a time stamp in association with predetermined identification information during the playing step in response to an instruction to store the time stamp representing a playing position of the content at that moment; and transmitting the identification information to the information management apparatus and requesting the playing of the content from the playing position represented by the time stamp, the identification information including information allotted to each user and information allotted to each user group, and the playing step plays the content from the playing position represented by the time stamp in accordance with the step of requesting the playing.

A program recorded on a recording medium for carrying out an information processing method of the present invention as well as a system for carrying out an information processing method of the present invention include playing content provided via a network from an information management apparatus that manages content; requesting that the information management apparatus store a time stamp in association with predetermined identification information during the playing step in response to an instruction to store the time stamp representing a playing position of the content at that moment; and transmitting the identification information to the information management apparatus and requesting the playing of the content from the playing position represented by the time stamp, the identification information including information allotted to each user and information allotted to each user group, and the playing step plays the content from the playing position represented by the time stamp in accordance with the step of requesting the playing.

An information management apparatus of the present invention includes providing means for providing predetermined content to an information processing apparatus via a network; and storing means for storing a time stamp in association with predetermined identification information in accordance with a request from the information processing apparatus, the time stamp representing a playing position of the content provided by the providing means, wherein the providing means is operable to provide the content from the playing position represented by the time stamp when the information processing apparatus transmits the identification information and requests that the content be played from the playing position represented by the time stamp.

An information management apparatus of the present invention may further include viewing status information storing means for storing viewing status information representing a viewing status of the content in accordance with a request from the information processing apparatus. In this case, the providing means is operable to provide the content from the playing position represented by the time stamp when the viewing status of the content represented by the viewing status information indicates that the content has not been played to the end.

An information management method of an information management apparatus of the present invention includes providing predetermined content to an information processing apparatus via a network; and storing a time stamp in association with predetermined identification information in accordance with a request from the information processing apparatus, the time stamp representing a playing position of the content provided by the providing step, wherein the providing step provides the content from the playing position represented by the time stamp when the information processing apparatus transmits the identification information and requests that the content be played from the playing position represented by the time stamp.

A program recorded on a recording medium for carrying out an information management method of the present invention as well as a system for carrying out an information management method of the present invention include providing predetermined content to an information processing apparatus via a network; and storing a time stamp in association with predetermined identification information in accordance with a request from the information processing apparatus, the time stamp representing a playing position of the content provided by the providing step, wherein the providing step provides the content from the playing position represented by the time stamp when the information processing apparatus transmits the identification information and requests that the content be played from the playing position represented by the time stamp.

In a communication system and method of the present invention, content provided from an information management apparatus via a network is played, and when an instruction to store a time stamp representing the playing position at that moment is given while the content is being played, the information management apparatus is requested to store the time stamp in association with predetermined identification information. In addition, the identification information is transmitted to the information management apparatus, the playing of the content from the playing position represented by the time stamp is requested, and the content is played from the playing position represented by the time stamp. Further, the content is provided to an information processing apparatus via the network, the time stamp is stored in association with the identification information in accordance with a request from the information processing apparatus, and the content is provided from the playing position represented by the time stamp when the identification information is transmitted and when a request is made to play the content from the playing position represented by the time stamp.

In an information processing apparatus and method as well as a program of the present invention, content provided via a network from an information management apparatus, which manages content, is played, and when an instruction to store a time stamp representing the playing position at that moment is given while the content is being played, the information management apparatus is requested to store the time stamp in association with predetermined identification information. In addition, the identification information is transmitted to the information management apparatus, the playing of the content from the playing position represented by the time stamp is requested, and the content is played from the playing position represented by the time stamp.

In an information management apparatus and method as well as a program of the present invention, predetermined content is provided to an information processing apparatus via a network, and in accordance with a request from the information processing apparatus, a time stamp, which represents the playing position for the content, is stored in association with predetermined identification information. In addition, when, from the information processing apparatus, the identification information is transmitted and a request is made to play the content from the playing position represented by the time stamp, the content is played from the playing position represented by the time stamp.

BRIEF DESCRIPTION OF THE DRAWINGS

FIG. 4 is a diagram showing an example of a screen displayed on a display device.

FIG. 7 is a diagram showing an example of bookmark information.

FIG. 19 is a flowchart explaining another operation of the communications system in FIG. 18.

DETAILED DESCRIPTION

Figure 1:
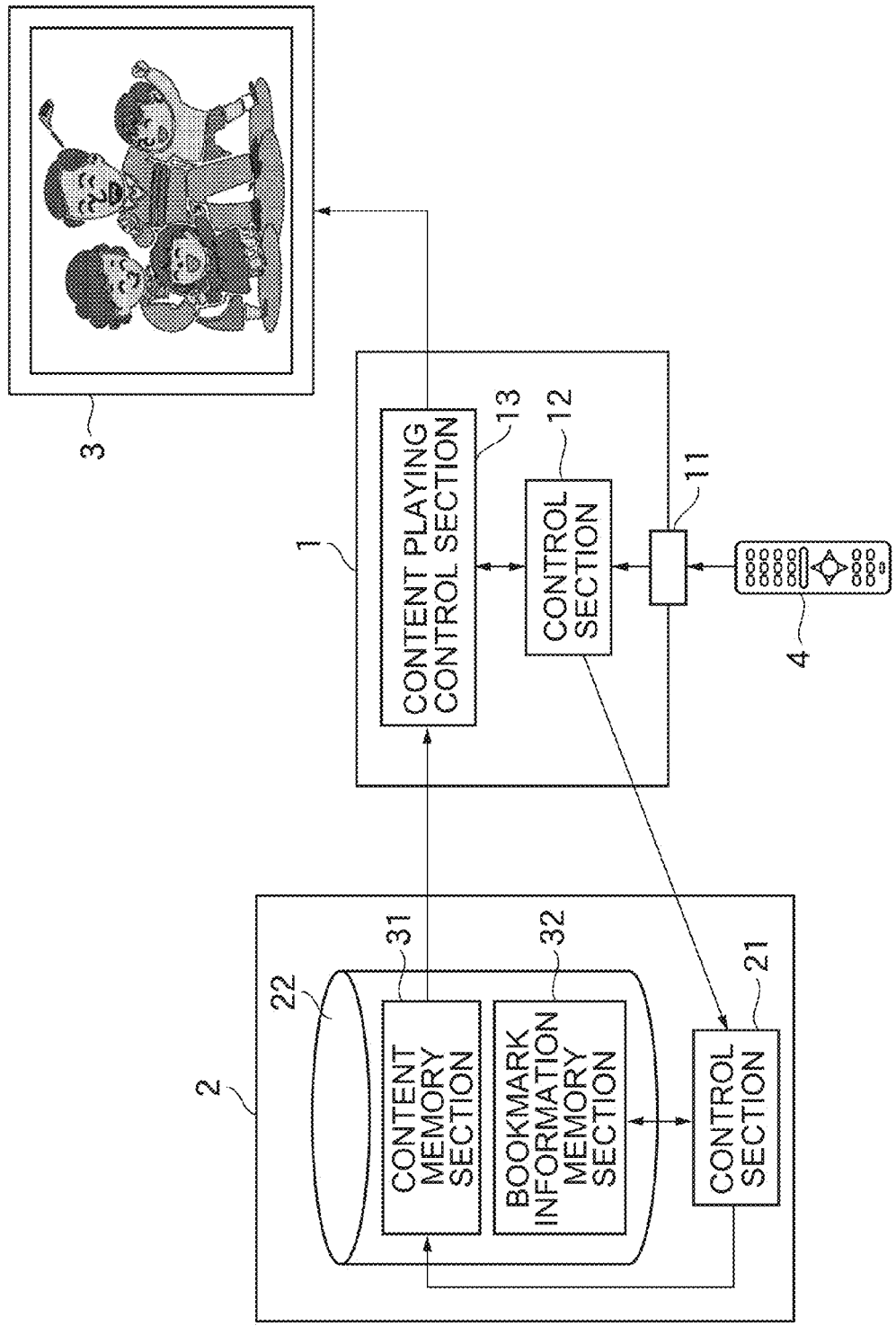
FIG. 1 is a diagram indicating a concept of a communications system to which the present invention is applied.

FIG. 1 is a diagram indicating the concept of a communications system to which the present invention is applied.

A client 1 and a server 2 are connected via, for example, a home network including a wired LAN (Local Area Network), a wireless LAN compliant with IEEE (Institute of Electrical and Electronics Engineers) 802.11a, 802.11b, or the like that is set up inside the home. Therefore, between the client 1 and the server 2, various kinds of information are transmitted and received via that home network.

In the communications system in FIG. 1, a user operates the client 1 using a remote controller 4, and is able to output video contents and the like stored in the server 2 to a display device 3 connected to the client 1.

For example, if the user operates the remote controller 4 and instructs the playing of a predetermined content, a command representing as much is transmitted from the remote controller 4 to the client 1 by way of infrared rays. That command is received by a control section 12 of the client 1 via a light acceptance unit 11.

The control section 12 that has received the command requests a control section 21 of the server 2 to play (streaming play) the content instructed by the user, and plays the content read from a memory section 22 and transmitted via the home network by controlling a content playing control section 13. Images of the content played by the content playing control section 13 are displayed on the display device 3.

It is noted that the memory section 22 of the server 2 includes not only a content memory section 31 in which contents are stored, but also a bookmark information memory section 32. Bookmark information including a time stamp representing, if content viewing has been stopped by the user, the stopped position is stored in this bookmark information memory section 32.

In other words, if the user stops the content being played in a predetermined timing, a command representing the stopping of the content is transmitted from the remote controller 4, and is acquired by the control section 12 via the light acceptance unit 11. With respect to the control section 21 of the server 2, the control section 12 requests the stopping of the content and requests storage of the bookmark information representing the stopped position of the content. In accordance with this request, the server 2 stops streaming the content, and makes the bookmark information memory section 32 store the bookmark information including the time stamp representing the stopped position of the content.

Then, later, if the user uses the remote controller 4 to instruct the playing of the content from the position at which viewing was stopped previously, information that requests playing from the previously stopped position is transmitted along with the identification information for the content to be played to the control section 21 of the server 2 from the control section 12 of the client 1. Based on the bookmark information stored in the bookmark information memory section 32, the server 2 refers to the time stamp representing the stopped position, and starts playing the content from the position designated by that time stamp.

Thus, even in a case where content viewing is interrupted (stopped), the user is able to resume content viewing from that interrupted position at a later time.

In addition, in FIG. 1, for purposes of convenience, it is depicted as if communications are performed directly between the control section 12 of the client 1 and the control section 21 of the server 2, as well as between the content memory section 31 of the server 2 and the content playing control section 13 of the client 1. However, as will be described later, in reality, such communications are performed via communications control sections (a communications control section 101 of the client 1 and a communications control section 121 of the server 2) that control communications.

It is noted that, in the communications system in FIG. 1, the contents and the bookmark information stored in the server 2 are made available to other clients (clients other than the client 1) that are connected to the home network as well.

Figure 2:
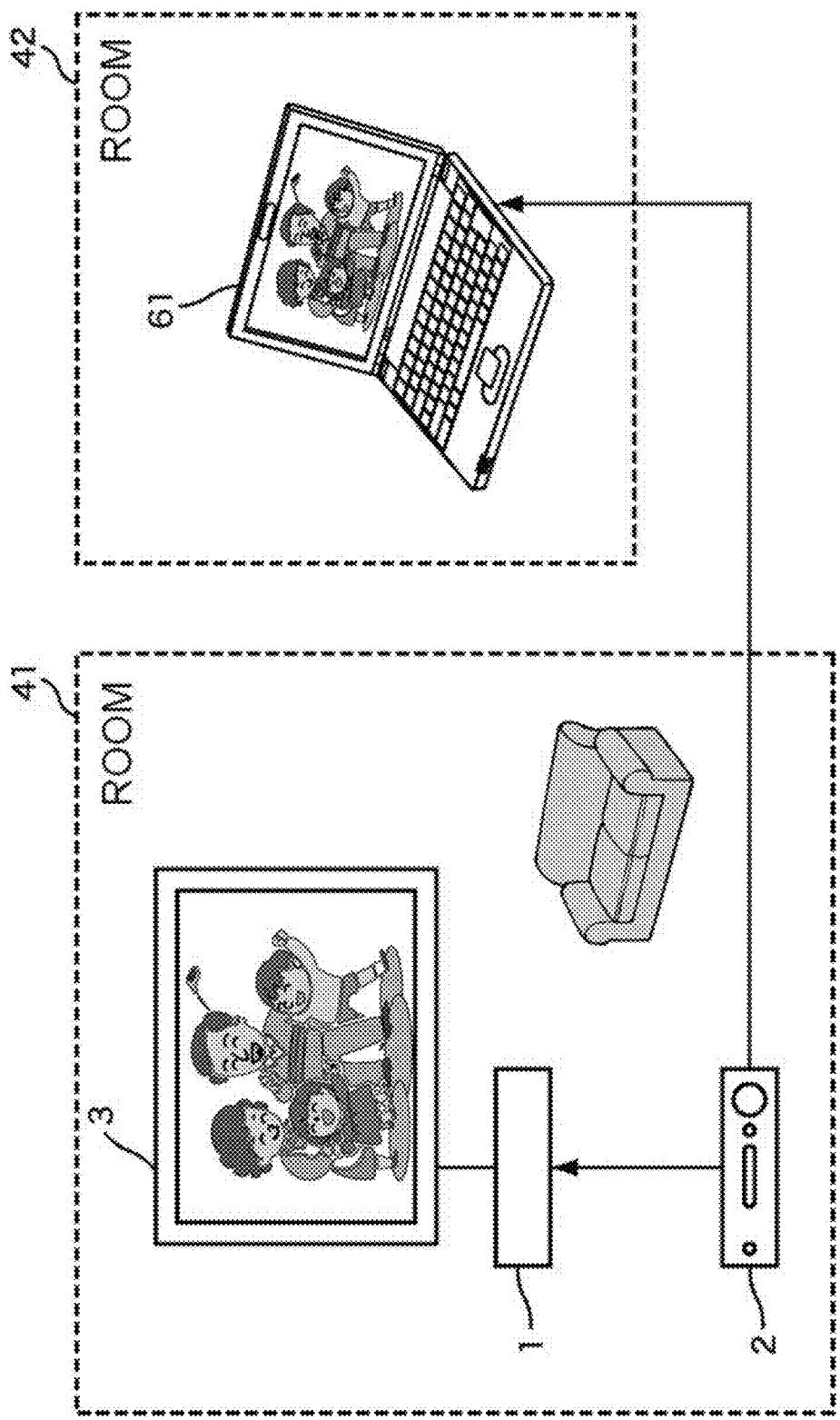
FIG. 2 is a diagram showing a configuration example of the communications system.

FIG. 2 is a diagram showing a configuration example of a communications system in a case where a plurality of clients are connected to the server 2. Elements that find correspondence in FIG. 1 are designated with the same reference numerals.

In the example in FIG. 2, the client 1, the server 2 and the display device 3 are set up in a room 41, and a client 61, which is a laptop personal computer, is set up in a room 42. As are the server 2 and the client 1, the server 2 and the client 61 in FIG. 2 are connected by a wireless LAN or the like. Therefore, as in the case of client 1, using the client 61, the user is able to view on the display section thereof the contents stored in the server 2.

In addition, since the bookmark information registered in the server 2 from the client 1 is available to the client 61 as well, the user is able to view contents on the display section of the client 61 from the position at which viewing was interrupted at the display device 3. It is noted that the same content image is displayed on the display device 3 and the display section of the client 61 in FIG. 2.

As will be described later, the bookmark information includes, besides the time stamp and the content identification information, identification information of the user (user ID) who uses it, identification information for identifying the group of the user (user group ID) and the like, for example. In other words, by having the bookmark information be read and having information such as the time stamp included therein be referred to on the basis of identification information input through a predetermined operation, the user, or group of users, are able to, using a predetermined client, view contents from the position designated by the bookmark information.

In addition, for example, in trying to view the content from the interrupted position, even if another user is already using the client that registered the bookmark information, the user is able to view the content from the interrupted position using another client.

Figure 3:
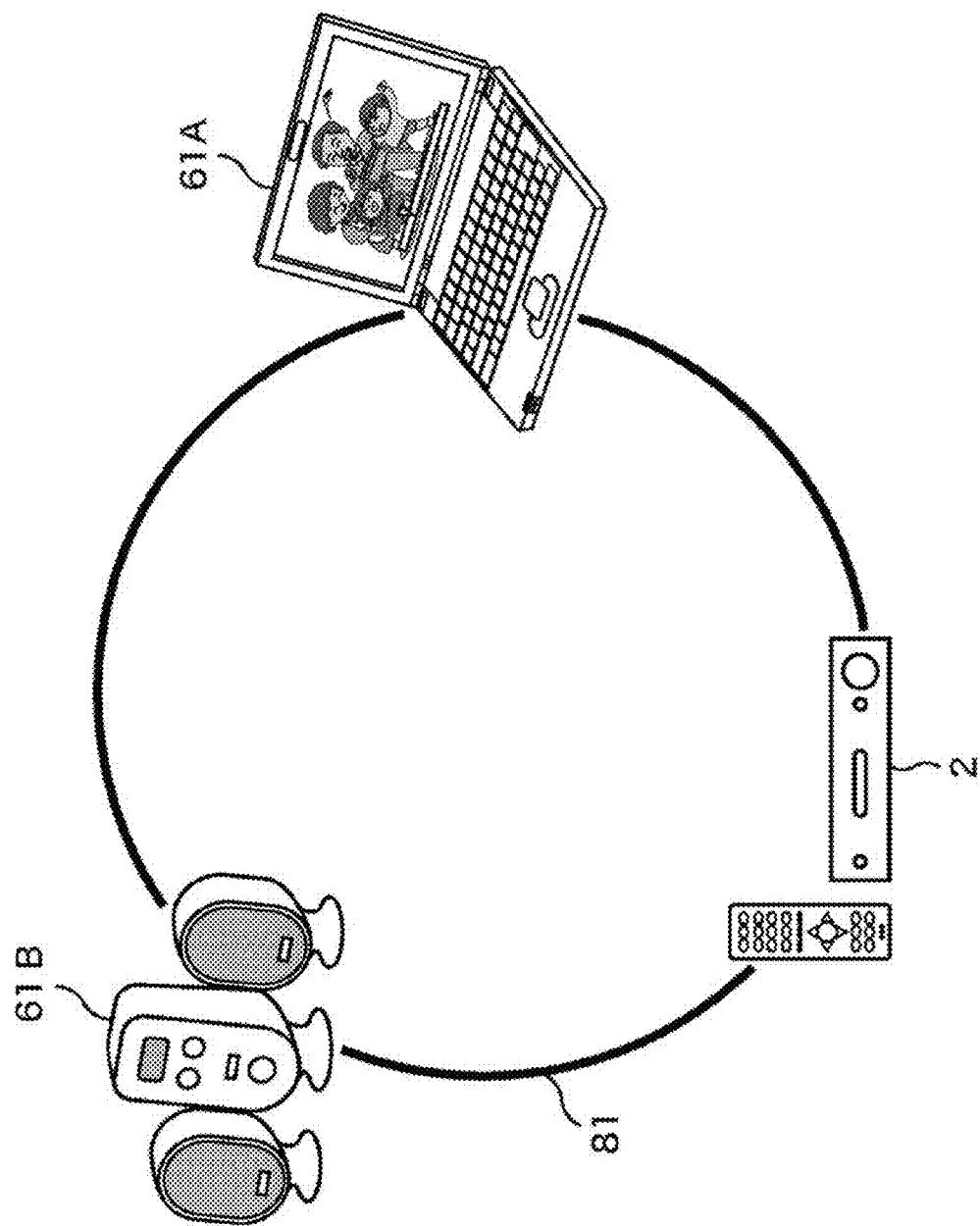
FIG. 3 is a diagram showing another configuration example of the communications system.

It is assumed above that the content for which the bookmark information is set is video content. However, as shown in FIG. 3, for example, bookmark information may also be set from a client 61B, which is an audio device connected to the server 2 via a home network 71, with respect to music content stored in the server 2. In addition, using a client 61A, which is a laptop personal computer connected to the server 2 via the home network 71, the user is able to make the server 2 refer to the bookmark information set from the client 61B and listen to music content from the position at which playing was interrupted at the client 61B.

Thus, bookmark information can be set to various contents, such as video contents, music contents, still picture contents and the like, and used. In addition, in a similar manner, bookmark information (bookmark) that is set for a predetermined web page as content may be shared among a group of users. It is noted that it may be arranged such that only contents that do not infringe upon the copyrights of another and do not cause damage to a copyright owner are made sharable.

In addition, clients that may use the contents and the bookmark information may be, besides personal computers and audio devices, various devices such as PDAs (Personal Digital Assistants), mobile phones and the like.

Further, in the communications system in FIG. 1, the user may register as the bookmark information not only the time stamp representing a subsequent play start point, but also a time stamp representing a user's favorite point (highlight point).

For example, when, while viewing video content, there is a scene that he likes, the user operates the remote controller 4 and instructs the registration of a highlight point. The client 1 that has received the command transmitted from the remote controller 4 and instructing the registration of a highlight point requests the server 2 to set a highlight point, and makes it store a time stamp representing the playing position at that moment.

Later, in a case where the user instructs content viewing starting from the highlight point, content playing is started in accordance with the time stamp registered as the highlight point.

FIG. 4 is a diagram showing an example of a screen of the display device 3 in a case where a highlight point is set for a predetermined video content.

The image displayed on a screen 3A is an image of the predetermined video content before playing from the highlight is instructed, and the image displayed on a screen 3B shown ahead of the outline arrow is the image of the video content when playing from the highlight point is instructed. In other words, when viewing from the highlight point is instructed, the playing position of the content is moved based on the time stamp designating the highlight point and the image is switched.

For example, in a case where the position of a pointer 52 on the screen 3A is the current playing position and the position of a pointer 53 is a highlight point, when playing from that highlight point is instructed, the playing position of the content is moved (the display switches), the position of the pointer 52 representing the current playing position is moved to the position of the pointer 53 as shown on the screen 3B.

It is noted that a bar 51 represents the duration of the entire content. In addition, depending on the user configuration, the displaying of the bar 51, and the pointers 52 and 53 in FIG. 4 can be switched on/off.

Figure 5:
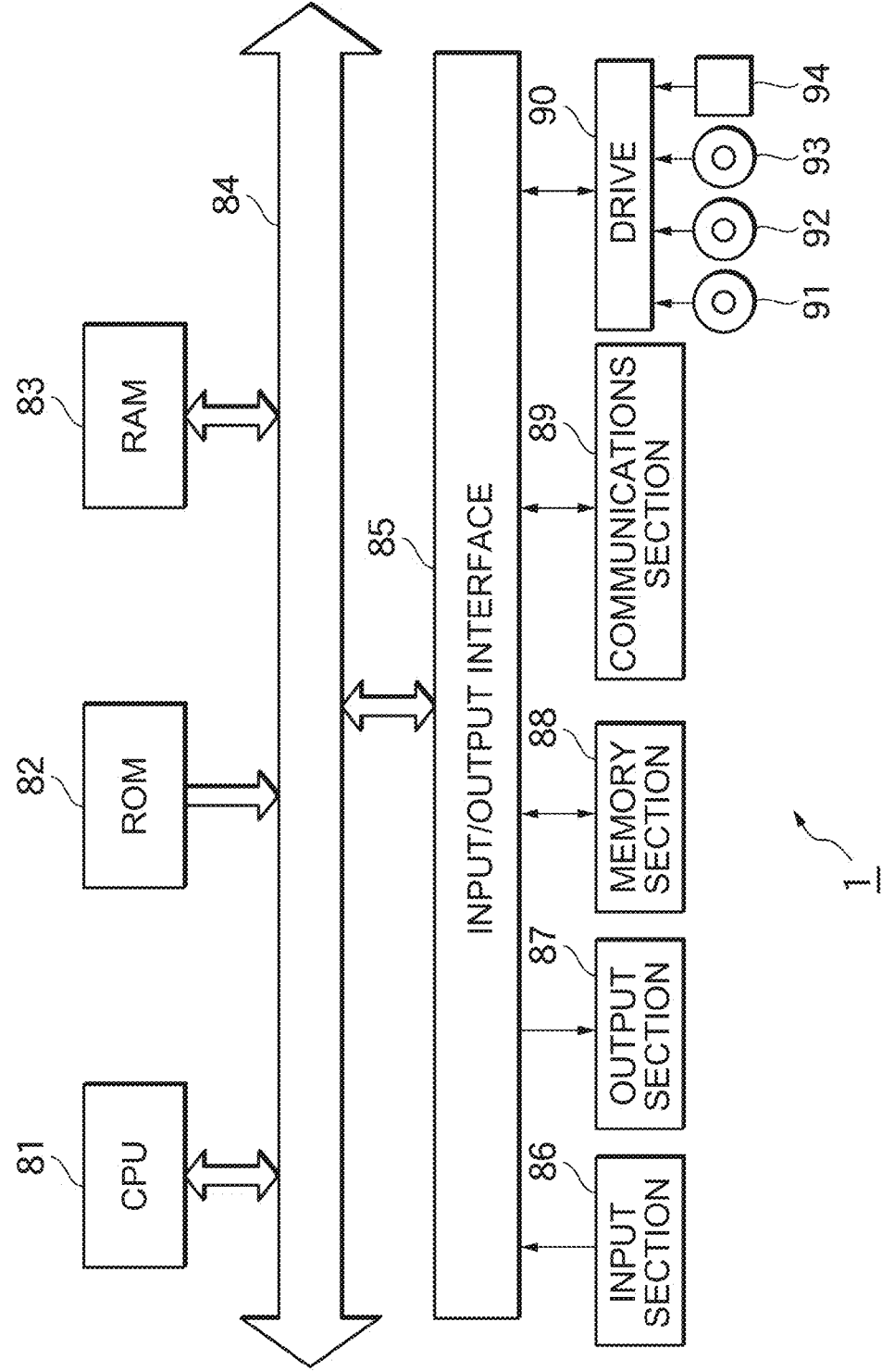
FIG. 5 is a block diagram showing a configuration example of a client in FIG. 1.

FIG. 5 is a block diagram showing a configuration example of the client 1 in FIG. 1.

A CPU (Central Processing Unit) 81 executes various processes in accordance with programs stored in a ROM (Read Only Memory) 82 or with programs loaded to a RAM (Random Access Memory) 83 from a memory section 88. In addition, data and the like that are necessary for the CPU 81 to execute various processes are stored in the RAM 83 as required.

The CPU 81, the ROM 82 and the RAM 83 are interconnected via a bus 84. An input/output interface 85 is also connected to this bus 84.

An input section 86, which may include a keyboard, a mouse, the light acceptance unit 11 for infrared rays emitted from the remote controller 4 and the like, an output section 87, which may include an interface for the display device 3 or a speaker and the like, the memory section 88, which may include a hard disk and the like, and a communications section 89 that performs communications via a home network are connected to the input/output interface 85.

As required, a drive 90 is also connected to the input/output interface 85, a magnetic disk 91, an optical disc 92, a magneto-optical disc 93, a semiconductor memory 94 or the like is loaded, and a computer program read therefrom is installed in the memory section 88 as required.

It is noted that the server 2 in FIG. 1 and the client 61 in FIG. 2 essentially have a similar configuration as the client 1 shown in FIG. 5. Therefore, hereinafter, the configuration in FIG. 5 will also be cited as the configuration of the server 2 and the client 61 (other clients besides the client 1) as required.

Figure 6:
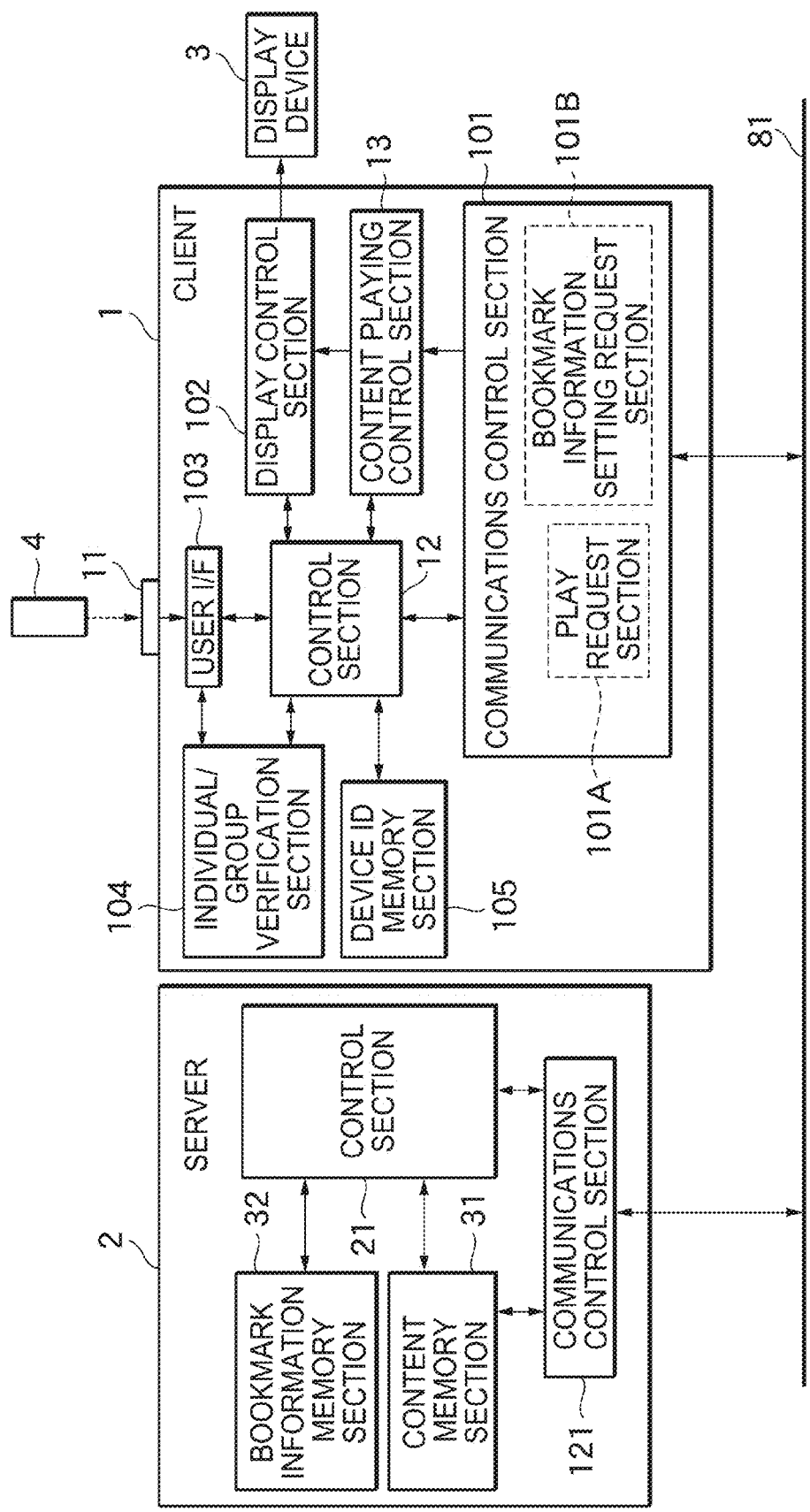
FIG. 6 is a block diagram showing a functional configuration example of the communications system in FIG. 1.

FIG. 6 is a block diagram showing a functional configuration example of the communications system in FIG. 1. As for elements described above, descriptions thereof will be omitted as deemed appropriate.

Each of the functional sections of the client 1 shown in FIG. 6 is realized by having a predetermined control program executed by the CPU 81 of the client 1.

The control section 12 controls the overall operations of the client 1. The communications control section 101 controls communications via the home network 71 that are performed by the communications section 89. For example, content (streaming data) transmitted from the server 2 via the home network 71 is acquired by this communications control section 101 and output to the content playing control section 13.

In addition, in the communications control section 101 are included a play request section 101A, which requests the server 2 to play contents, and a bookmark information setting request section 101B. In other words, a request by the control section 12 to play contents is performed via the play request section 101A, and a request by the control section 12 to set bookmark information is performed via the bookmark information setting request section 101B.

A display control section 102 controls the displaying of images on the display device 3 on the basis of data that is played by the content playing control section 13. A user interface (I/F) control section 103 acquires commands included in the infrared rays received at the light acceptance unit 11, and outputs them to the control section 12.

For example, when the playing of content from a position designated by bookmark information is requested of the server 2, an individual/group verification section 104 performs, as required, verification on the basis of user ID, user group ID, a predetermined password and the like with the control section 21 of the server 2. A device ID memory section 105 stores therein device IDs and outputs them to the control section 12 as required. These device IDs are information unique to each device, such as MAC (Media Access Control) addresses and the like, and are used in the verification process with the server 2 as required.

Each of the functional sections of the server 2 is realized by having a predetermined control program executed by the CPU 81 of the server 2.

The control section 21 controls the overall operations of the server 2. The communications control section 121 controls communications with the client 1 that are performed via the home network 71.

The content memory section 31 stores contents and provides requested contents in accordance with requests from the client 1. The bookmark information memory section 32 stores bookmark information and provides it to the control section 21 as required.

It is noted that, in FIG. 6, only the client 1 is shown as the client that uses the contents stored in the server 2, however, other clients (such as the client 61 in FIG. 2) having a configuration similar to the client 1 are also connected to the home network 71.

FIG. 7 is a diagram showing an example of the bookmark information stored in the bookmark information memory section 32 of the server 2.

For example, in the bookmark information are included "bookmark number (No)" as identification information, and the ID of the content that is the subject of that bookmark information. In other words, bookmark information is set for each content in accordance with instructions from the user.

In addition, the bookmark information includes information representing whether, with respect to a client that has notified a valid user ID, access to the bookmark information is to be authorized (whether a confirmation, by user ID, of an access right is necessary) (authorized/unauthorized), information representing whether, with respect to a client that has notified a valid user group ID, access to the bookmark information is to be authorized, and information representing whether, with respect to a client that has notified a valid device ID, access to the bookmark information is to be authorized.

For example, by setting such that a client that has notified a valid user ID is authorized to access the bookmark information, the user is able to use the bookmark information from any client that is capable of accessing the server 2 by inputting the user ID. In addition, by setting such that a client that has notified a valid user group ID is authorized to access the bookmark information, the user is able to share one bookmark information among a plurality of users that know the user group ID. Further, by setting such that a client that has notified a valid device ID is authorized to access the bookmark information, one bookmark information may be shared among users that use the client to which the device ID is allocated.

Returning to the description of FIG. 7, the bookmark information includes pointer type (type as in what position the position designated by the pointer represents) and a time stamp value representing the position of that pointer.

The bookmark number allocated to the bookmark information shown in FIG. 7 is "001," and the ID of its subject content is "777777." In addition, in order to use the bookmark information, verification by user ID is necessary, and the user ID is given as "123456."

Further, the bookmark information in FIG. 7 includes a play start position for the next occasion (the position at which playing was previously stopped) and a pointer representing a play end position. Specifically, the bookmark information in FIG. 7 represents the fact that the content is to be played from the position of a play start pointer set in a timing at which "0 hours 12 minutes and 34 seconds (0 h 12 m 34 s)" have elapsed from the beginning of the content, and the fact that no play end pointer designating the position at which playing is to end is set and the content is to be played to its end.

Bookmark information including such various kinds of information is set for each content and is managed by the bookmark information memory section 32.

Next, operations of each device in the communications system in FIG. 6 will be described.

First, with reference to the flowchart in FIG. 8, a process by the client 1 that is performed in accordance with operations on the remote controller 4 by the user will be described.

In step S1, the user interface control section 103 acquires via the light acceptance unit 11 a command transmitted from the remote controller 4 and accepts an operation by the user. A signal corresponding to the operation accepted by the user interface control section 103 is output to the control section 12.

In step S2, on the basis of the output from the user interface control section 103, the control section 12 determines whether the playing of content from a play start point registered as bookmark information is instructed by the user. If in step S2 the control section 12 determines that playing from the play start point that is set for a predetermined content is instructed, the process goes to step S3.

In step S3, the control section 12 generates play request data including the content ID of the content for which playing is requested, a user ID, a user group ID, and a command instructing playing from the play start point (pointer type: play start), and proceeds to step S4 to transmit it to the server 2. Thus, after verification based on the user ID, the user group ID and the like is performed at the server 2 as required, the playing of the content designated by the content ID is started from the play start point (step S52 in FIG. 10).

On the other hand, if in step S2 the control section 12 determines that the playing of the content from the play start point is not instructed by the user, the process goes to step S5, and the control section 12 determines whether the stopping of the content currently playing is instructed.

In step S5, in a case where it is determined by the control section 12 that the stopping of the content currently playing is instructed, the process goes to step S6 and the content playing control section 13 reads the time stamp at that moment of the content currently playing. The time stamp value read by the content playing control section 13 is output to the control section 12.

In step S7, the control section 12 generates bookmark information registration request data including the content ID of the content for which playing is requested to stop, a user ID, a user group ID, a command requesting the registration of a play start pointer (a pointer representing the play start position for the next occasion) and the time stamp value read by the content playing control section 13, and the process goes to step S8 where the control section 12 transmits it to the server 2. Thus, after verification based on the user ID, the user group ID and the like is performed at the server 2 as required, bookmark information registration is performed (step S32 in FIG. 9).

In other words, in this example, registration of the bookmark information is performed when the stopping of the content currently playing is requested. It is noted that the bookmark information may also be registered when the pausing of the content is requested, or when the playing of other contents instead of the currently playing content is instructed.

In step S5, in a case where the control section 12 determines that the stopping of the content currently playing is not instructed, the process goes to step S9 where the control section 12 determines whether registration of a highlight point is requested. In step S9, in a case where it is determined that registration of a highlight point is requested, the process goes to step S10 where the content playing control section 13 reads the time stamp at that moment of the content currently playing. The time stamp value read by the content playing control section 13 is output to the control section 12.

In step S11, the control section 12 generates highlight point registration request data including the content ID of the content for which registration of a highlight point is requested, a user ID, a user group ID, a command representing a request to register a highlight point, and the time stamp value read by the content playing control section 13, and the process goes to step S12, where the control section 12 transmits the data to the server 2. Thus, after verification based on the user ID, the user group ID and the like is performed at the server 2 as required, highlight point (bookmark information) registration is performed (step S32 in FIG. 9)

On the other hand, in a case where, in step S9, it is determined that registration of a highlight point is not requested, the process goes to step S13, where the control section 12 determines whether the playing of the content from a highlight point is instructed. For example, the playing of the content from a highlight point may be performed by pressing the fast-forward button on the remote controller 4 twice in succession.

Figure 8:
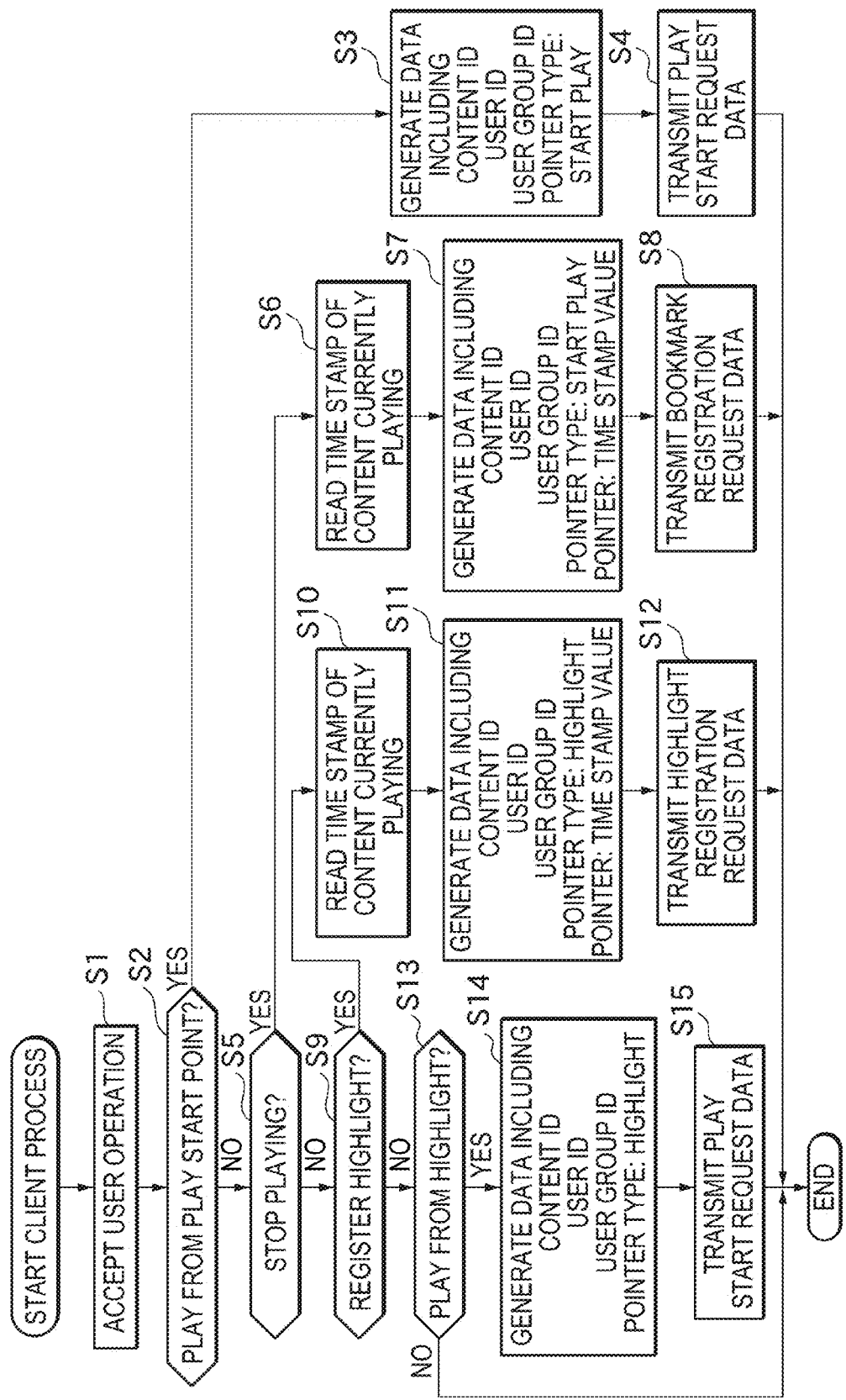
FIG. 8 is a flowchart explaining a process by the client.

In step S13, in a case where the control section 12 determines that the playing of the content from a highlight point is not instructed, it recognizes that some other operation unrelated to content playing has been performed, and after executing a process corresponding thereto, terminates the process in FIG. 8.

In step S13, in a case where the control section 12 determines that the playing of the content from a highlight point is instructed, the process goes to step S14 and the control section 12 generates play start request data including the content ID of the content for which playing from a highlight point is requested, a user ID, a user group ID, and a command instructing playing from the highlight point.

In step S15, the control section 12 transmits the generated play start request data to the server 2. Thus, after verification based on the user ID, the user group ID and the like is performed at the server 2 as required, the playing of the content from the highlight point is performed (step S51 in FIG. 10).

Next, with reference to the flow chart in FIG. 9, a bookmark information registration process executed by the server 2 in correspondence to the process in FIG. 8 will be described.

In step S31, the control section 21 of the server 2 controls the communications control section 121 and receives the bookmark information registration request data (the registration request data for the play start point for the next occasion transmitted in step S8 in FIG. 8, or the highlight point registration request data transmitted in step S12) transmitted from the client 1. The bookmark information registration request data received by the control section 21 is output to the bookmark information memory section 32.

In step S32, the bookmark information memory section registers the bookmark information based on the data supplied from the control section 21. Thus, a list, such as the one shown in FIG. 7, is created and stored.

Figure 10:
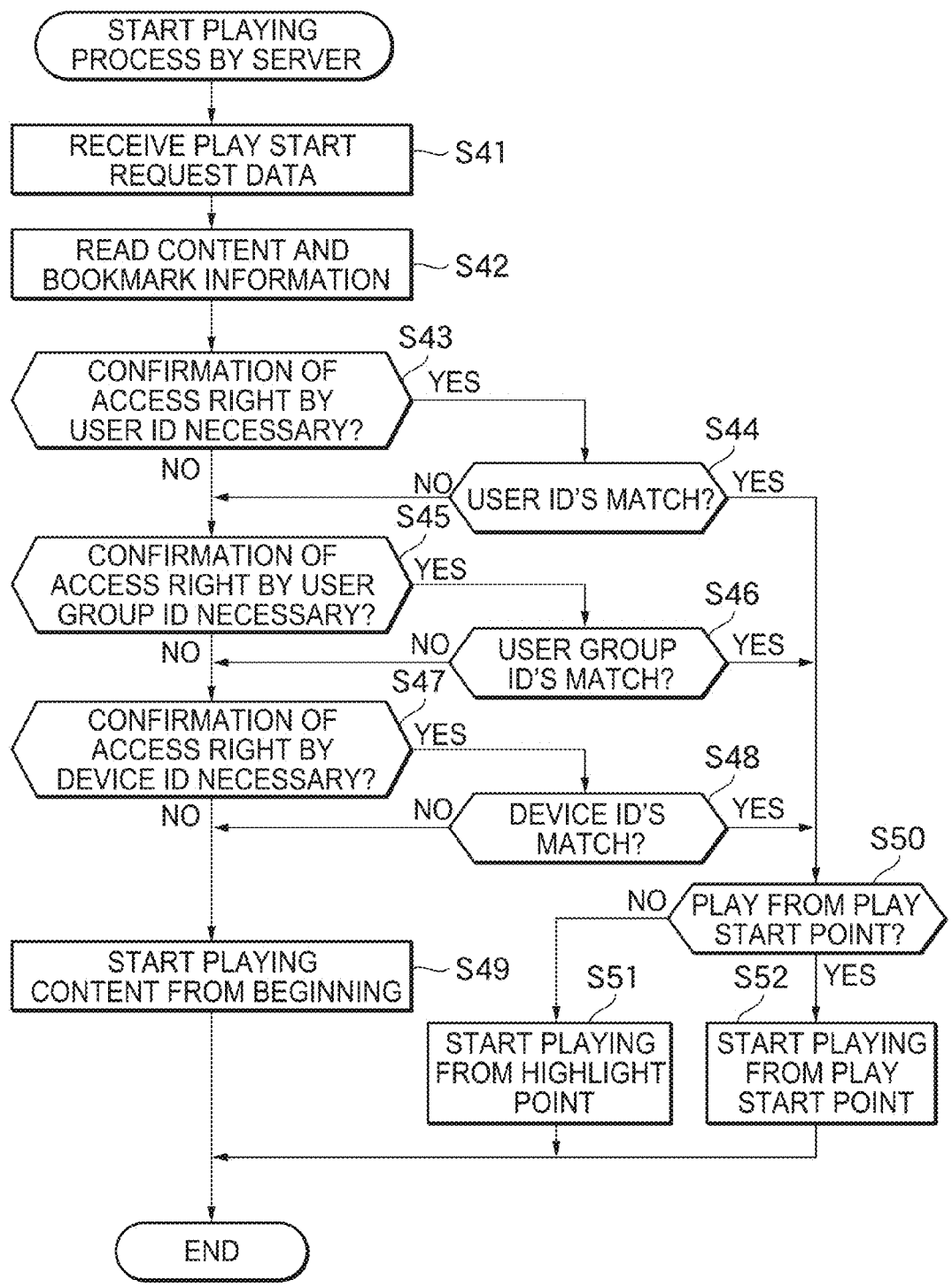
FIG. 10 is a flowchart explaining a content playing process by the server executed in correspondence with the process in FIG. 8.

Next, with reference to the flow chart in FIG. 10, a content playing process executed by the server 2 in correspondence to the process in FIG. 8 will be described.

In step S41, the control section 21 of the server 2 controls the communications control section 121 and receives the play start request data transmitted from the client 1 in step S4 in FIG. 8 or the play start request data transmitted from the client 1 in step S15.

In step S42, on the basis of the content ID included in the play start request data, the control section 21 reads from the content memory section 31 the content to which that ID is allocated, and reads the bookmark information for the content from the bookmark information memory section 32. As described above, the content ID for the subject content is included in each bookmark information.

In step S43, the control section 21 refers to the information included in the bookmark information read in step S42, and determines whether a confirmation of an access right by user ID is necessary. In step S43, in a case where the control section 21 determines that a confirmation of an access right by user ID is necessary, the process goes to step S44 and the control section 21 determines whether the user ID transmitted from the client 1 matches with the user ID included in the bookmark information that is read.

In a case where the control section 21 determines in step S43 that a confirmation of an access right by user ID is not necessary, as well as in a case where it determines in step S44 that the user ID transmitted from the client 1 does not match with the user ID included in the bookmark information, the process goes to step S45.

In step S45, the control section 21 determines whether a confirmation of an access right by user group ID is necessary. In step S45, in a case where the control section 21 determines that confirmation of access right by user group ID is necessary, the process goes to step S46 and the control section 21 determines whether or not the user group ID transmitted from the client 1 matches with the user group ID included in the bookmark information that is read.

In a case where the control section 21 determines in step S45 that confirmation of an access right by user group ID is not necessary, as well as in a case where it determines in step S46 that the user group ID transmitted from the client 1 does not match with the user group ID included in the bookmark information, the process goes to step S47.

In step S47, the control section 21 determines whether confirmation of an access right by device ID is necessary. In step S47, in a case where the control section 21 determines that confirmation of an access right by device ID is necessary, the process goes to step S48 and the control section 21 determines whether the device ID transmitted from the client 1 matches with the device ID included in the bookmark information that is read.

In a case where the control section 21 determines in step S47 that confirmation of an access right by device ID is not necessary, as well as in a case where it determines in step S48 that the device ID transmitted from the client 1 does not match with the device ID included in the bookmark information, the process goes to step S49.

In step S49, the control section 21 plays the content requested by the client 1 from its beginning. In other words, data is transmitted by the communications control section 121 to the client 1 via the home network 71 from the beginning of the content read from the content memory section 31. At the client 1, a playing process for the content transmitted from the server 2 is performed (step S62 in FIG. 11).

On the other hand, in a case where in step S44 it is determined that the user ID transmitted from the client 1 matches with the user ID included in the bookmark information, in a case where in step S46 it is determined that the user group ID transmitted from the client 1 matches with the user group ID included in the bookmark information, or in a case where in step S48 it is determined that the device ID transmitted from the client 1 matches with the device ID included in the bookmark information, the process proceeds to step S50.

In step S50, the control section 21 determines whether playing from a play start point registered as bookmark information is requested by the client 1, and if it determines that playing from a play start point is not requested, that is, in a case where it determines that playing from a highlight point is being requested, the process goes to step S51.

In step S51, the control section 21 refers to a time stamp representing the position of the highlight point, and starts playing the read content from the position corresponding to the time stamp. In other words, data of the content from the position designated by the time stamp of the highlight point is transmitted to the client 1 via the home network 71. At the client 1, a playing process for the content transmitted from the server 2 is performed.

On the other hand, in step S50, in a case where the control section 21 determines that playing from a play start point is requested, the process goes to step S52, and the control section 21 refers to a time stamp included in the bookmark information and representing the position of the play start point and starts playing the content from the position of the time stamp. In other words, data of the content from the position designated by the time stamp of the play start point is transmitted to the client 1 via the home network 71. At the client 1, a playing process for the content transmitted from the server 2 is performed.

Such processes may be executed not only by the client 1 but also by other clients connected to the server 2 via the home network 71.

In the processes above, use of the bookmark information is allowed to a client that transmits the same user ID as the user ID registered in that bookmark information. Therefore, by setting such that verification by user ID is executed, the user is able to view contents from play start points and highlight points from various devices capable of accessing the server 2 using the bookmark information.

In other words, bookmark information is made available not only to the client that registered that bookmark information but also to various clients connected to the server 2, and the user is able to view contents more efficiently and comfortably.

In addition, in the processes above, use of the bookmark information is allowed to a client that transmits the same user group ID as the user group ID registered in that bookmark information, and thus, the bookmark information may be shared among a plurality of users. For example, a user may register his favorite scene as a highlight point and let another user view the content from the scene.

Next, with reference to the flow chart in FIG. 11, a process by the client 1 playing content will be described.

In step S61, the communications control section 101 receives content transmitted from the server 2 via the home network 71. For example, in a case where playing from a play start point is requested, data of the content from the position is transmitted from the server 2 (step S52 in FIG. 10). The content received by the communications control section 101 is output to the content playing control section 13.

In step S62, the content playing control section 13 plays (decodes) the content supplied from the communications control section 101, and outputs the obtained data to the display control section 102. In step S63, the display control section 102 displays images of the content on the display device 3 on the basis of the output from the content playing control section 13.

It is noted that, in a case where music content is transmitted from the server 2, music is output from a speaker, not shown in the drawings, on the basis of data that is played by the content playing control section 13.

Figure 12:
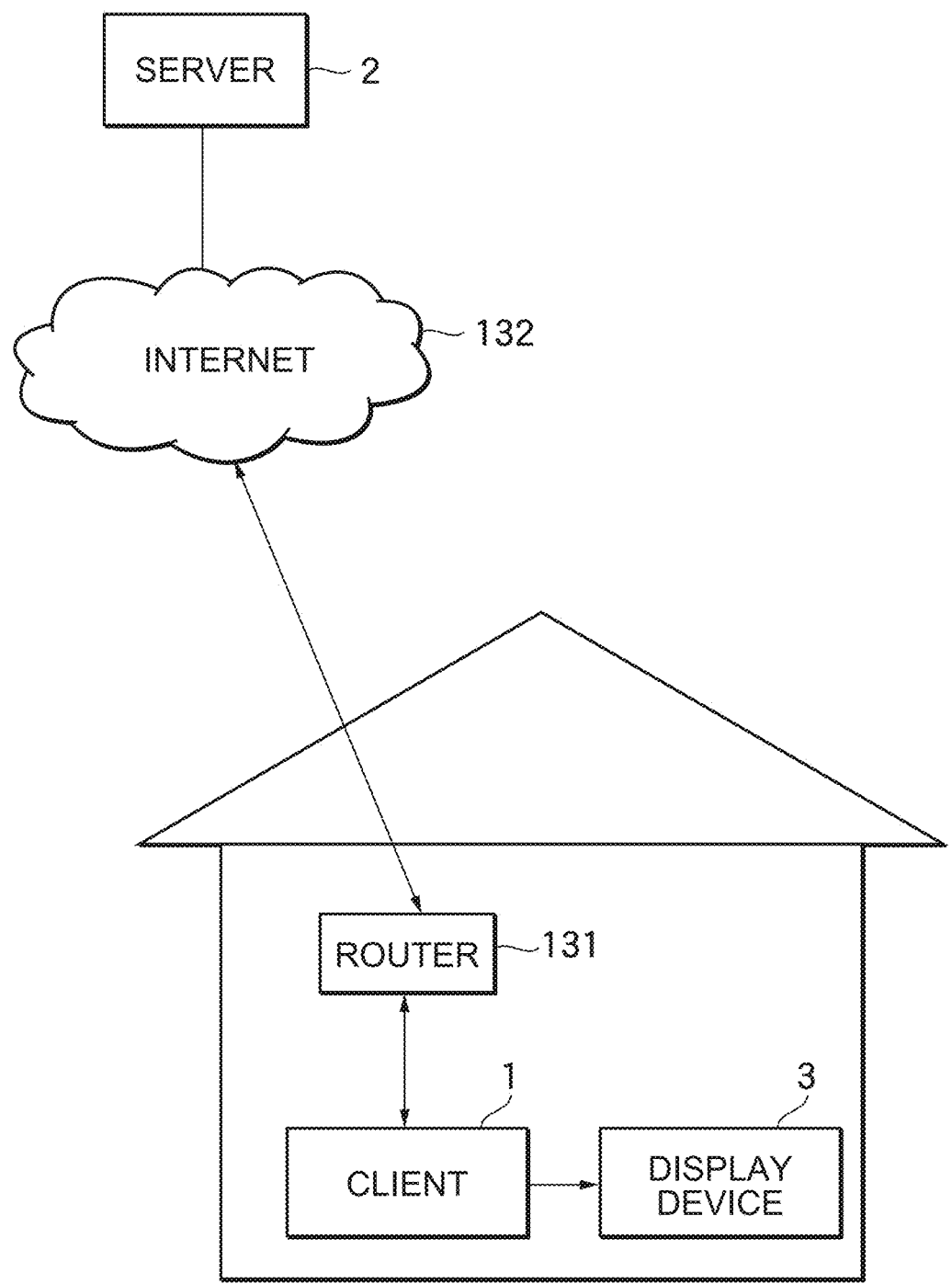
FIG. 12 is a diagram showing another configuration example of the communications system.

In the description above, the client 1 and the server 2 were described as being connected by the home network 71 including a LAN and the like, but as shown in FIG. 12, the server 2 may exist outside of the home, and the client 1 and the server 2 may be connected via a router 131 and the Internet 132. Thus, even if the server 2 is connected via the Internet 132 and the like, through processes similar to those above, the user is able to use the bookmark information registered in the server 2 from a client connected to a home network within the home or from a client connected to the Internet 132.

In addition, in the description above, the server that manages contents and bookmark information (the server 2) were described as being the same device, but contents and bookmark information may also be managed by different devices.

Figure 13:
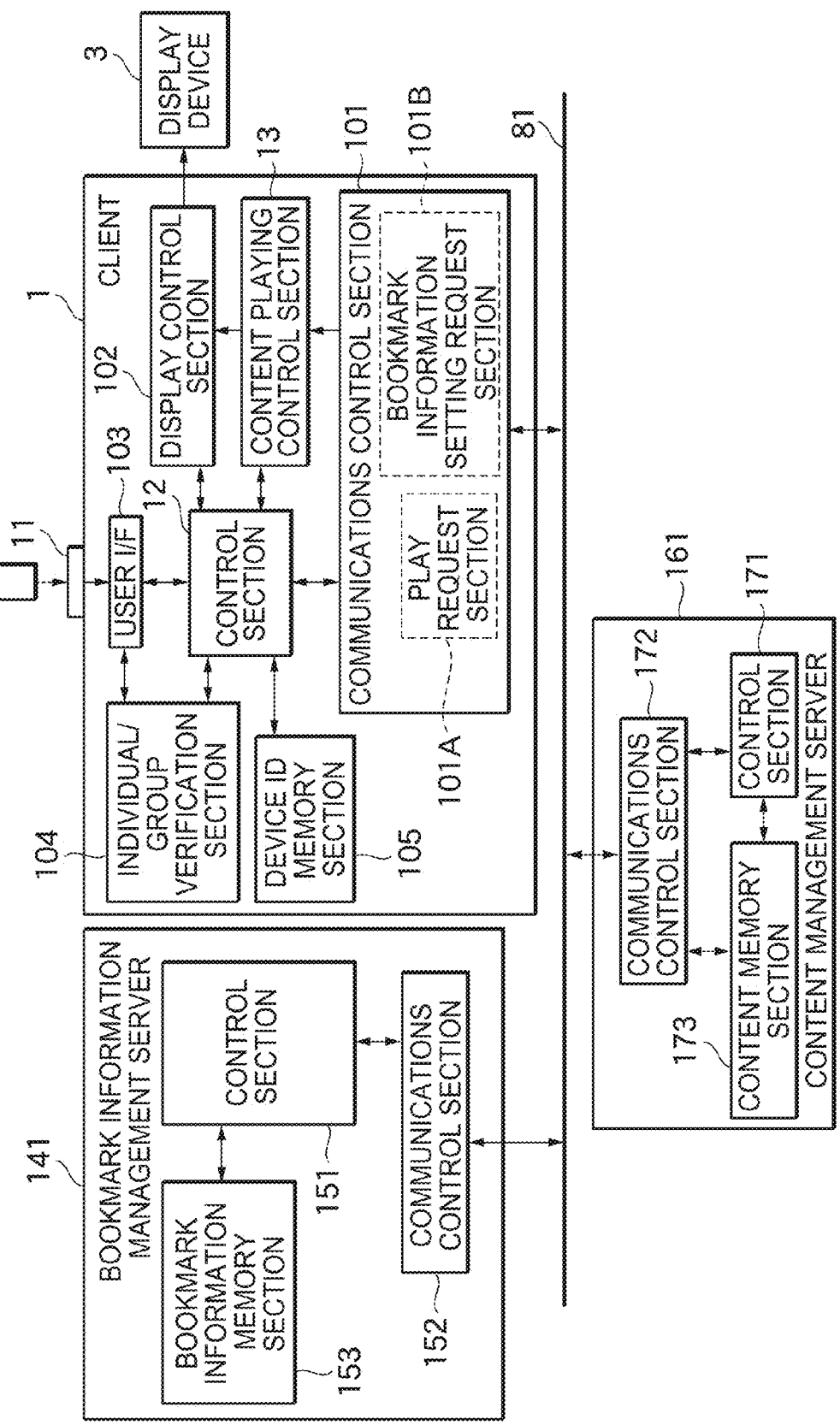
FIG. 13 is a block diagram showing another functional configuration example of the communications system to which the present invention is applied.

FIG. 13 is a block diagram showing another functional configuration example of a communications system to which the present invention is applied. Elements that find correspondence in FIG. 6 are designated with the same reference numerals.

A bookmark information management server 141 is a server managing bookmark information, and a content management server 161 is a server managing contents. In other words, functions of the server 2 in FIG. 6 are realized by the bookmark information management server 141 and the content management server 161.

A control section 151 of the bookmark information management server 141 controls the overall operations of the bookmark information management server 141, and a communications control section 152 controls communications performed via the home network 71. In addition, a bookmark information memory section 153 stores and manages, for example, bookmark information that is set by the client 1.

A control section 171 of the content management server 161 controls the overall operations of the content management server 161, and a communications control section 172 controls communications performed via the home network 71. In addition, a content memory section 173 manages contents, and provides contents requested by the client 1.

In the communications system in FIG. 13, when registration of bookmark information is instructed by the user while the content provided by the content management server 161 is being played (when the stopping of the content is instructed and registration of a play start point is instructed, or when registration of a highlight point is instructed), the client 1 transmits a time stamp value representing the position that was being played at that moment and the like to the bookmark information management server 141, requests registration of bookmark information, and requests the content management server 161 to stop transmitting the content.

Then, at a later time, in a case where the playing of the content from the position designated by that bookmark information is requested, the client 1 requests the bookmark information management server 141 to notify the content management server 161 of the position (time stamp) in the content designated by the bookmark information.

When a time stamp is notified by the bookmark information management server 141, the content management server 161 starts playing the content from that position. In addition, requests carried out by the client 1 with respect to the bookmark information management sever 141, and requests carried out by the bookmark information management server 141 with respect to the content management server 161 also include information such as content ID and the like.

At the client 1, the content transmitted from the content management server 161 is played.

Thus, the server that manages bookmark information and the server that manages contents may each be configured as physically distinct devices.

Next, operations of each device in the communications system in FIG. 13 will be described.

First, with reference to the flow chart in FIG. 14, a process by the client 1 in FIG. 13 will be described.

Figure 14:
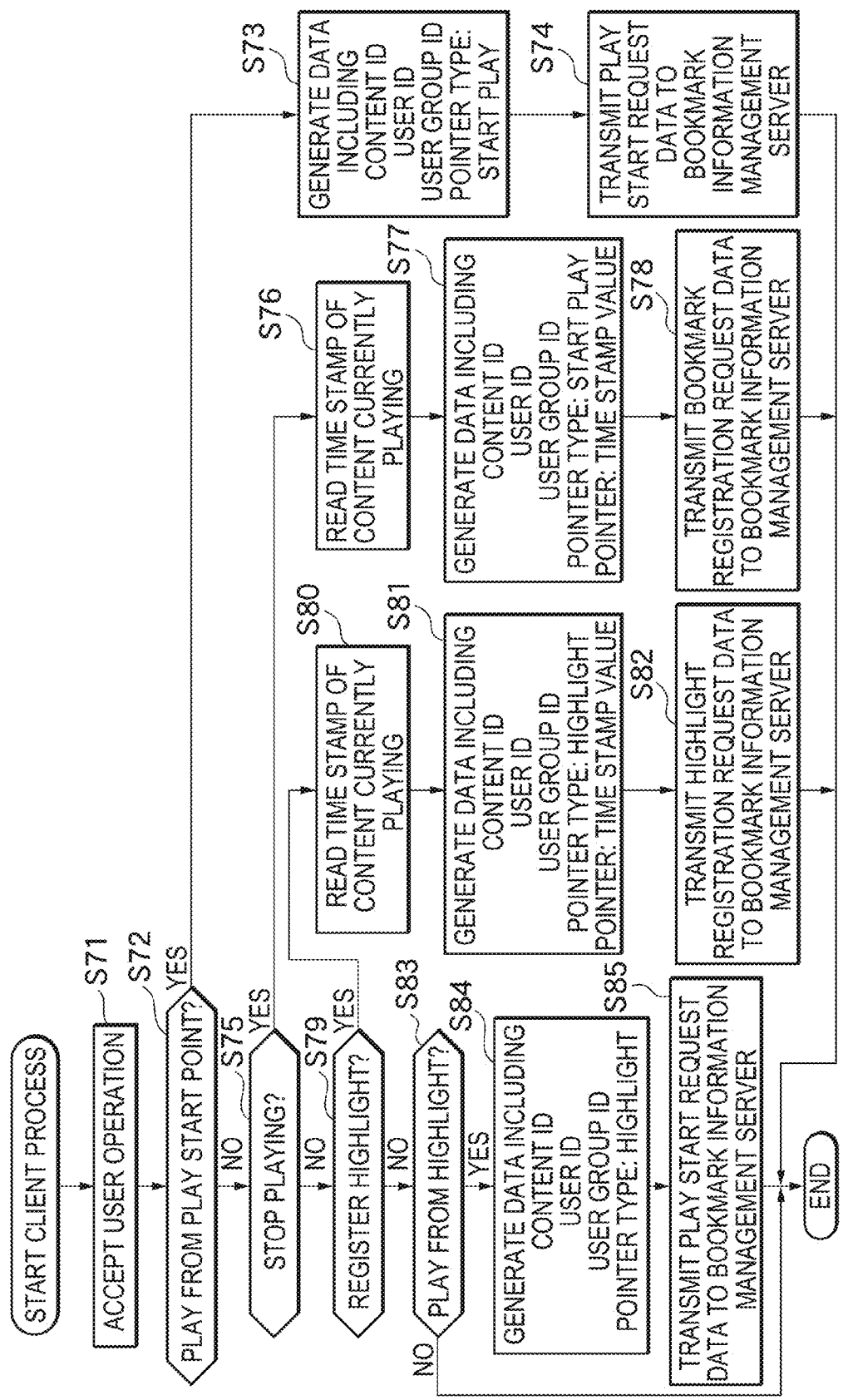
FIG. 14 is a flowchart explaining a process by a client in FIG. 13.

The process in FIG. 14 is a process that is essentially similar to the process in FIG. 8 described above, and redundant descriptions will be omitted as deemed appropriate. In other words, when in step S72 it is determined that playing from a play start point is instructed by user operations accepted in step S71, the process goes to step S73 and play request data, which requests the playing of content from a play start point, is generated. The generated play start request data is transmitted to the bookmark information management server 141 in step S74.

The data transmitted at this point also includes information that requests the bookmark information management server 141 to notify the content management server 161 of information on the time stamp (time stamp of the play start point) registered in the bookmark information. At the bookmark information management server 141 that has received the play start request data, for example, the bookmark information is read on the basis of the content ID, and the time stamp registered therein representing the play start point is notified to the content management server 161 (step S93 in FIG. 15).

On the other hand, in a case where in step S75 it is determined that the stopping of the content currently playing is instructed, bookmark information registration request data that includes a time stamp read in step S76 and that requests the registration of a play start point is generated in step S77. The generated bookmark information registration request data is transmitted to the bookmark information management server 141 in step S78. It is noted that, in step S78, data requesting the content management server 161 to stop the playing of the content is also transmitted from the client 1.

In step S79, in a case where it is determined that registration of a highlight point is instructed, bookmark information registration request data that includes a time stamp read in step S80 and that requests the registration of a highlight point is generated in step S81. The generated bookmark information registration request data is transmitted to the bookmark information management server 141 in step S82.

In step S83, in a case where it is determined that the playing of the content from a highlight point is not instructed, the process is terminated. On the other hand, in a case where it is determined that playing from a highlight point is instructed, play start request data that requests playing from a highlight point is generated in step S84. The generated play start request data is transmitted to the bookmark information management server 141 in step S85.

The play start request data transmitted at this point also includes information requesting the bookmark information management server 141 to notify the content management server 161 of information on the time stamp of the highlight point. At the bookmark information management server 141 that has received the play start request data, the bookmark information is read on the basis of the content ID and the like, and the time stamp registered therein representing the highlight point is notified to the content management server 161 (step S93 in FIG. 15).

Figure 15:
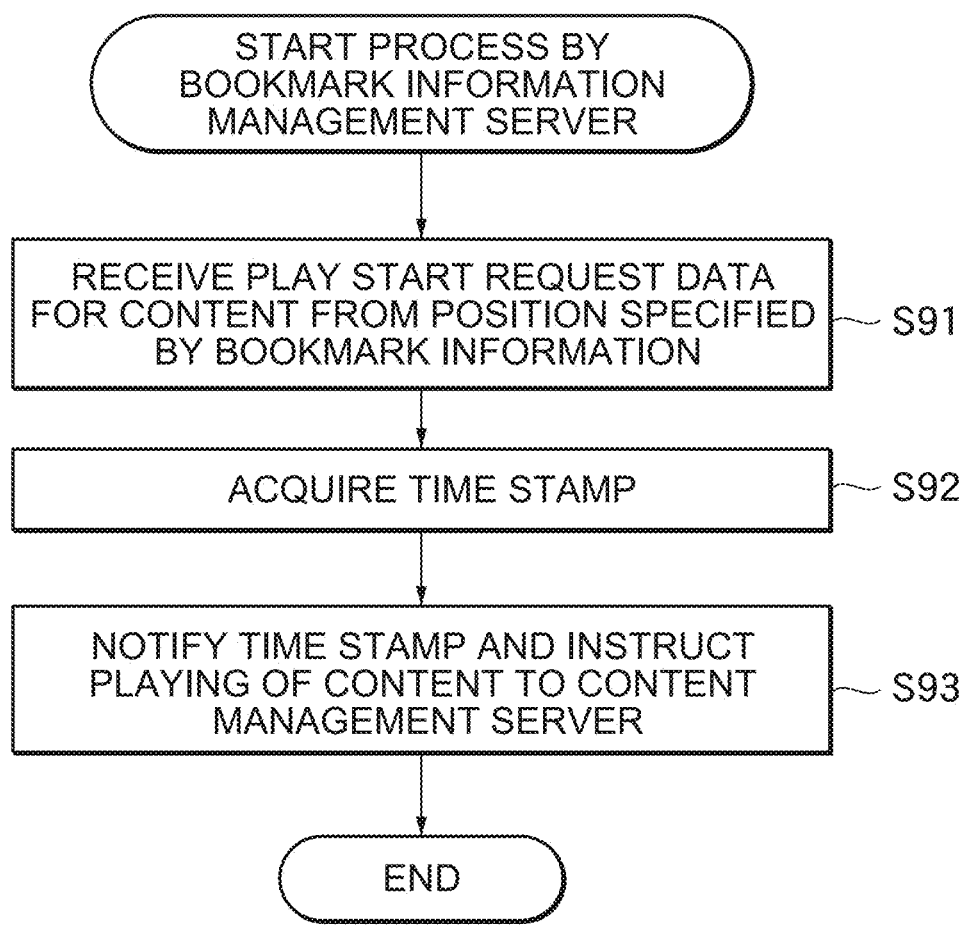
FIG. 15 is a flowchart explaining a process by a bookmark information management server executed in correspondence with the process in FIG. 14.

Next, with reference to the flow chart in FIG. 15, a process executed by the bookmark information management server 141 in correspondence to the process in FIG. 14 will be described. This process is executed when the play start request data for content is transmitted from the client 1 in step S74 or S85 in FIG. 14.

In step S91, the communications control section 152 of the bookmark information management server 141 receives the play start request data transmitted from the client 1 via the home network 71. The received play start request data is output to the control section 151.

In step S92, on the basis of the content ID and the like included in the play start request data, the control section 151 reads from the bookmark information memory section 153 the bookmark information that is set for the content for which the user requests playing, and acquires the time stamp (the time stamp of a play start point or the time stamp of a highlight point) included therein.

In step S93, the control section 151 of the bookmark information management server 141 controls the communications control section 152, notifies the content management server 161 of the time stamp acquired in step S92, and instructs the playing of the content from the position of that time stamp. For example, the content ID of the content to be played, address information of the client 1 that requests provision of the content and the like are also notified to the content management server 161.

Through the process above, the time stamp of a play start point or the time stamp of a highlight point is notified to the content management server 161.

Figure 9:
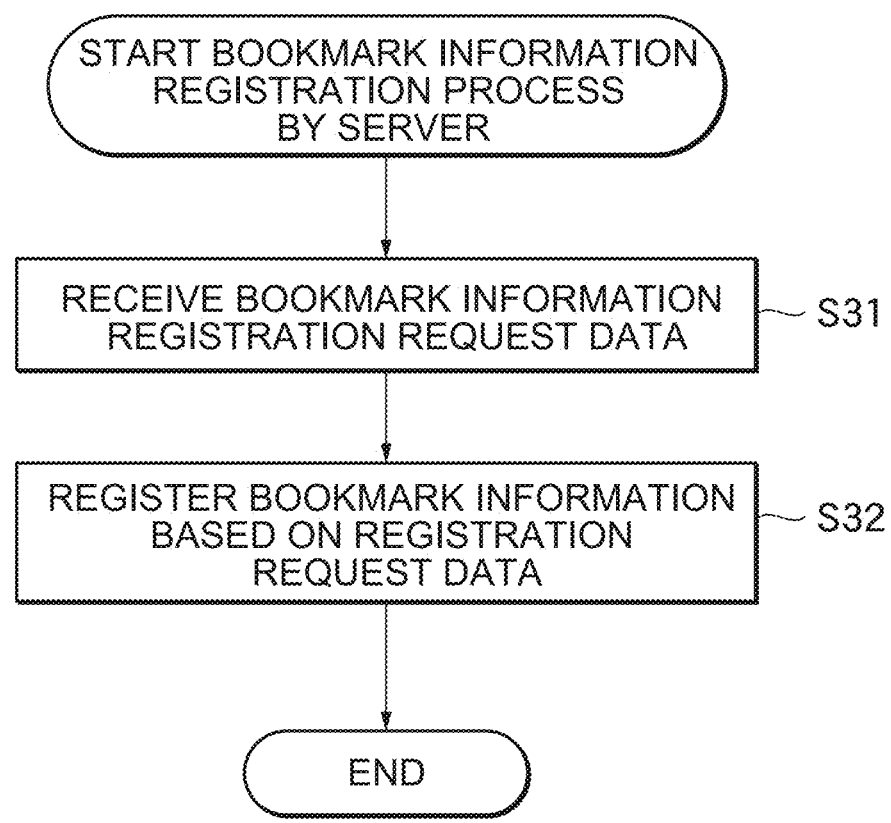
FIG. 9 is a flowchart explaining a bookmark information registration process by a server executed in correspondence with the process in FIG. 8.

It is noted that, in a case where registration of bookmark information is requested by the client 1 in step S78 or S82 in FIG. 14, the process described with reference to FIG. 9 is executed by the bookmark information management server 141, and bookmark information designating a play start point or a highlight point is registered.

Figure 16:
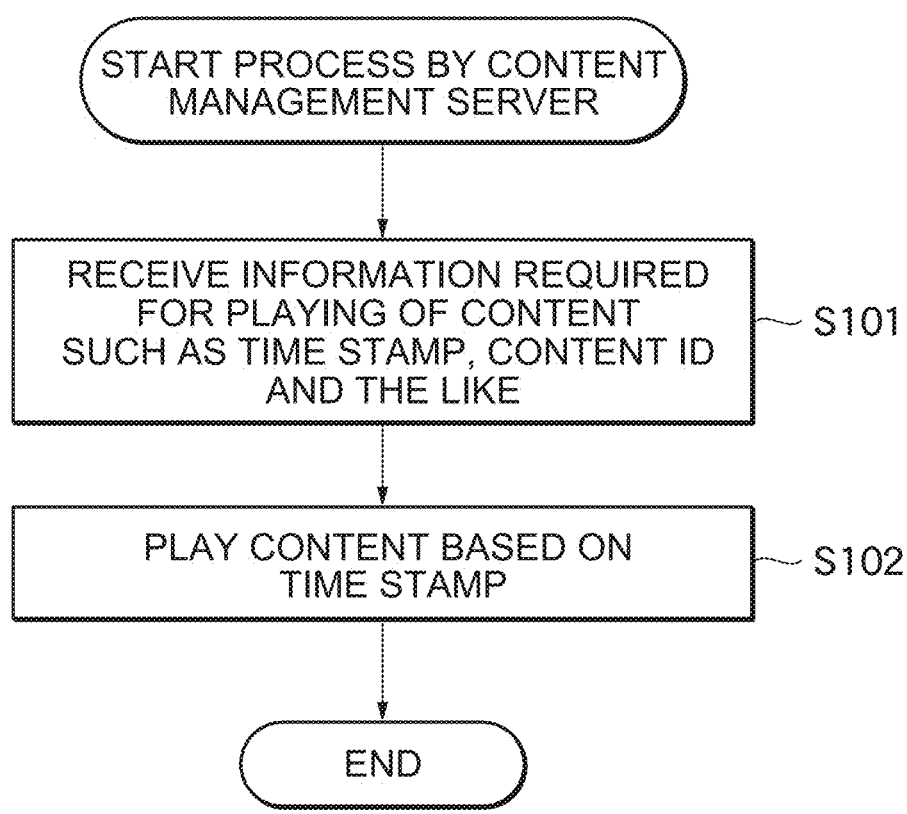
FIG. 16 is a flowchart explaining a process by a content management server executed in correspondence with the process in FIG. 15.

Next, with reference to the flow chart in FIG. 16, a process executed by the content management server 161 in correspondence to the process in FIG. 15 will be described.

In step S101, the communications control section 172 of the content management server 161 receives information, which is transmitted from the bookmark information management server 141, that is necessary in order to play a content, such as a time stamp representing the position of a play start point or a highlight point, the content ID of the content for which playing is instructed, address information of the client and the like. The information received by the communications control section 172 is output to the control section 171.

In step S102, the control section 171 plays the content instructed by the user from the position of the time stamp transmitted from the bookmark information management server 141. In other words, data of the content from the position designated by the time stamp is transmitted to the client 1 from the content management server 161.

Figure 11:
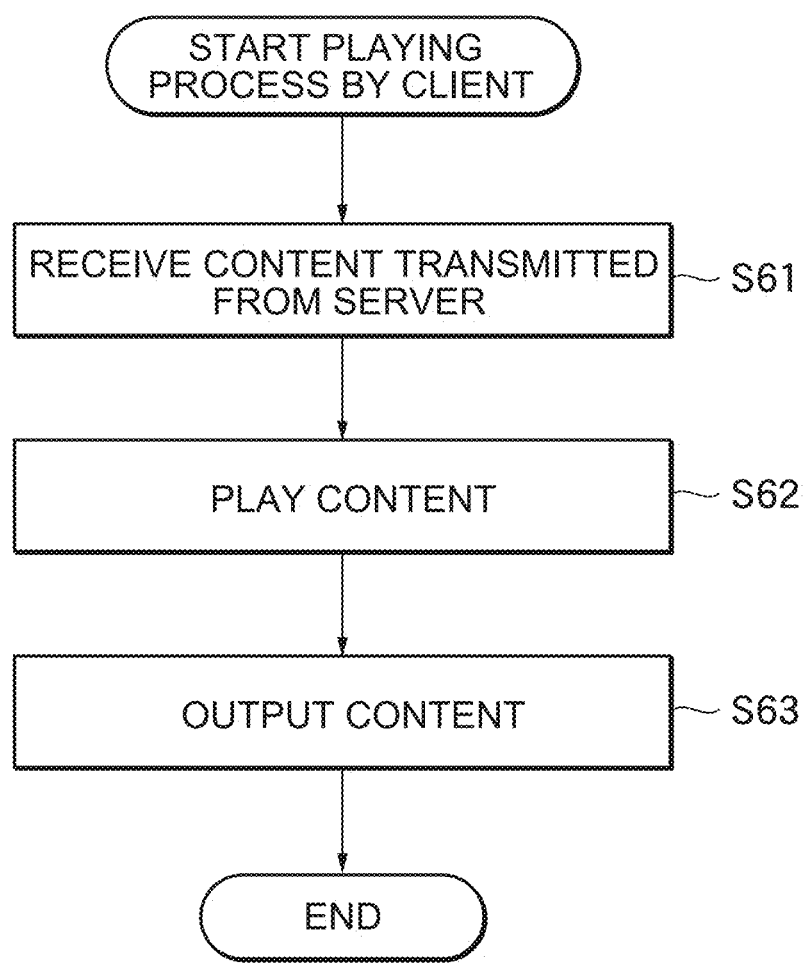
FIG. 11 is a flowchart explaining a content playing process by the client.

At the client 1, the process described with reference to FIG. 11 is executed, and the content is played from the play start point or the highlight point managed by the bookmark information management server 141.

Thus, it is possible to configure each of the server that manages bookmark information and the server that manages contents with different devices.

In the description above, the playing of contents is controlled on the basis of bookmark information. However, the playing of contents may also be controlled on the basis of the user's viewing status of the contents.

Figure 17:
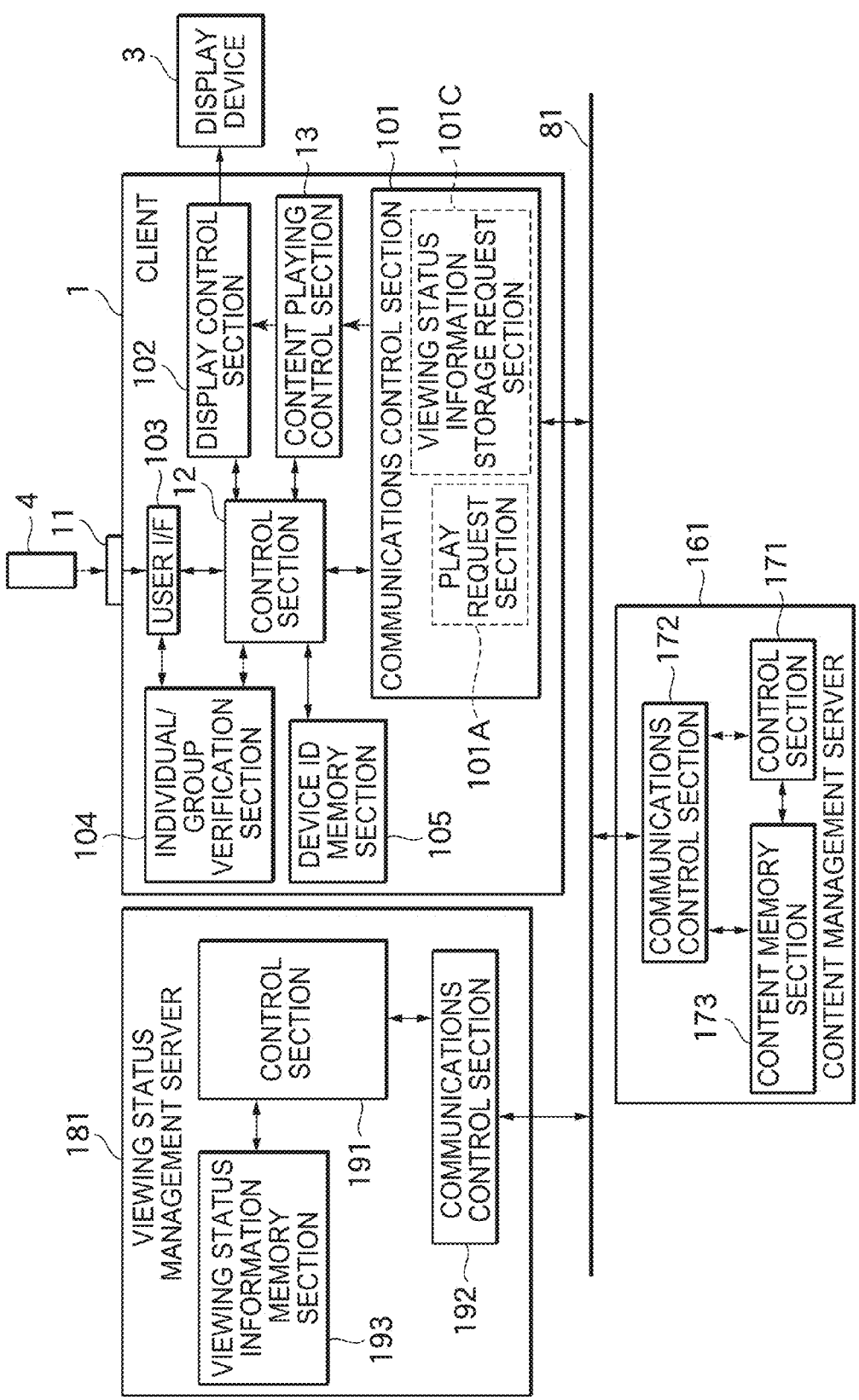
FIG. 17 is a block diagram showing another configuration example of the communications system to which the present invention is applied.

FIG. 17 is a block diagram showing a functional configuration example of another communications system to which the present invention is applied. Elements that find correspondence in FIG. 13 are designated with the same reference numerals and detailed descriptions thereof are omitted where appropriate.

A viewing status information management server 181 manages content viewing statuses (content playing statuses) by the user carried out using the client 1. Specifically, with a viewing status information memory section 193 of the viewing status information management server 181, viewing status information, which includes the viewing status of content (for example, that it is in a paused state and the like), the content ID of the content, information on the provider of the content (the content management server 161), information, for example, such as the time stamp of the paused position if the viewing status of the content is in a paused state, and the like, is stored.

A request to store this viewing status information is performed by the control section 12 of the client 1 with respect to the viewing status information management server 181 via a viewing status information storage request section 101C included in the communications control section 101.

Then, for example, when the client 1 is booted, viewing status information including a time stamp representing the paused position is transmitted to the content management server 161 from the viewing status information management server 181 via the client 1, and the playing of the content is controlled from the paused position designated by that time stamp.

By having the playing of the content controlled in accordance with the viewing status of the content at the next boot, for example, the user is able to view the content efficiently.

In addition, as with the bookmark information described above, since the viewing status information is registered in association with the user ID, user group ID, device ID and the like, it can be used to view contents from a client other than the client that registered the viewing status information.

Next, the operations of each device in the communications system in FIG. 17 will be described.

Figure 18:
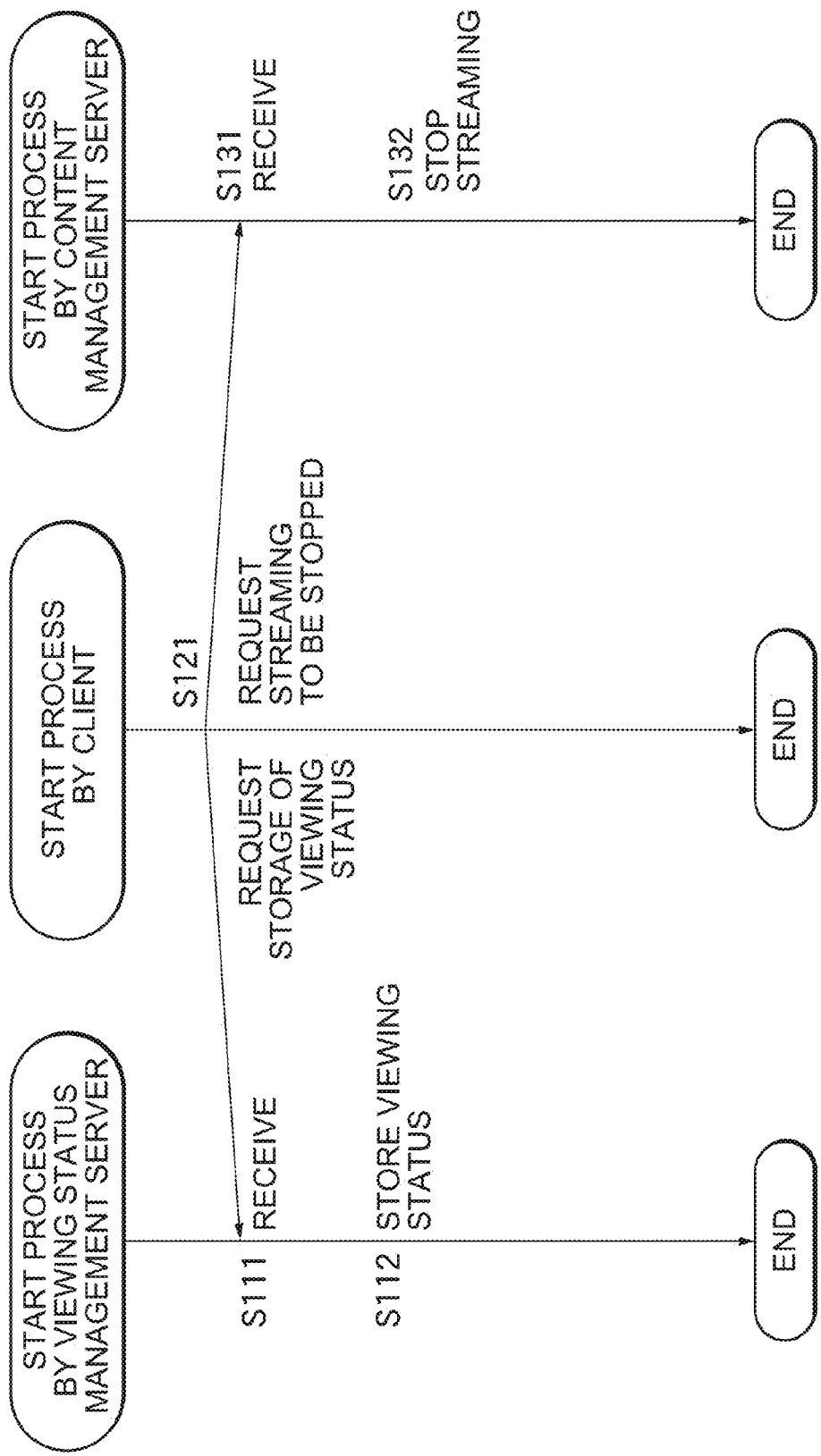
FIG. 18 is a flowchart explaining the operation of the communications system in FIG. 17.

First, the operations of the communications system in FIG. 17 that are performed when the pausing of the content currently playing is instructed will be described with reference to the flow chart in FIG. 18.

For example, when the pausing of the content currently playing is instructed by the user, the control section 12 of the client 1 controls the communications control section 101, and in step S121, requests the content management server 161 to stop streaming, while notifying the viewing status information management server 181 that the playing of the content is in a paused state and requesting storage thereof.

A control section 191 of the viewing status information management server 181 controls a communications control section 192, receives the request from the client 1 in step S111, proceeds to step S112, and makes the viewing status information memory section 193 store viewing status information including the fact that the status of the content viewed at the client 1 is of a paused status, the content ID of that content, information on the provider of the content (the content management server 161), a time stamp representing the paused position, and the like.

In addition, the viewing status information is stored in association with the user ID. Therefore, when the client 1 is booted and the user ID transmitted, at the viewing status information management server 181, the viewing status information is read on the basis of the user ID, and the playing of the content is controlled in accordance with the viewing status represented thereby.

On the other hand, the control section 171 of the content management server 161 that has received the request to stop streaming in step S131 proceeds to step S132, and stops the streaming of the content that was being provided to the client 1 up to that point.

Next, with reference to the flow chart in FIG. 19, a process by the communications system of playing content on the basis of the viewing status information stored in the viewing status information management server 181 will be described.

For example, in a predetermined timing, such as when booted, the control section 12 of the client 1 controls the communications control section 101, and requests the viewing status information management server 181 to notify viewing status information in step S151. This request includes, for example, the user ID of the user of the client 1 and the like.

In step S141, the request from the client 1 is received by the control section 191 of the viewing status information management server 181. In step S142, the control section 191 reads the viewing status information for the client 1 from the viewing status information memory section 193 on the basis of the user ID transmitted from the client 1, proceeds to step S143, and notifies it to the client 1.

In step S152, the control section 12 of the client 1 receives the viewing status information transmitted from the viewing status information management server 181. In step S153, for example, on the basis of the information included in the viewing status information and which designates the provider of the content, the control section 12 notifies the content management server 161 of the received viewing status information, and requests the playing (resumption of streaming) of the content on the basis of the viewing status information.

In step S161, the request from the client 1 is received by the control section 171 of the content management server 161 via the home network 71 and the communications control section 172.

From the viewing status information, the control section 171 acquires the content ID, the fact that the playing of the content is in a paused state, and the time stamp representing that paused position, and in step S162, on the basis of the content ID, reads the content stored in the content memory section 173, and starts the streaming of the content (transmission of the content) from the position designated by the time stamp.

In step S154, the content transmitted from the content management server 161 is received by the control section 12 of the client 1, and the playing thereof is performed in step S155. In other words, the content from the paused position is played by the content playing control section 13, and corresponding images are output to the display device 3.

Through the process above, by merely setting it such that the user ID is notified to the viewing status information management server 181, the user is able to view the remaining content from the paused position in a predetermined timing, such as when the client is booted, without having to perform any operations himself.

In addition, since viewing status information is acquired on the basis of user ID, and the playing of the content is controlled on the basis of the acquired viewing status information, the user is able to view the content that is to be played on the basis of the viewing status information from a client other than the client 1. In this case, the user needs to set the client such that the user ID is notified to the viewing status information management server 181.

In the description above, a process for a case where, as the viewing status of the content, the content currently playing is in a paused state is described. However, similarly, even in cases where, for various reasons, playing is interrupted, such as when the power of the client 1 is forcibly turned off while the content is being played or a case where the player for the content is forcibly shut down while the content is being played and the like, viewing status information representing those statuses may be stored, and the playing of the content may be started on the basis of the viewing status information.

It is noted that a trigger for automatically starting the playing of the content is not to be limited to the booting of the client 1 described above. For example, automatic playing of content may be carried out in a predetermined timing, such as when a user ID or a password is entered by the user or when the player for the content is launched and the like.

Further, the configuration of the communications system shown in FIG. 17 may be altered as deemed appropriate. For example, the content management server 161 may be provided on the Internet, or the content management server 161 and the viewing status information management server 181 may be physically incorporated into a single device.

In addition, in the description above, the viewing status information is transmitted to the content management server 161 from the viewing status information management server 181 via the client 1, but the information may be transmitted directly from the viewing status information management server 181 to the content management server 161.

The series of processes described above may be executed by hardware, but they may also be executed through software.

In a case where the series of processes are to be executed through software, programs constituting the software are installed, via a network or a recording medium, to a computer incorporated into dedicated hardware or to, for example, a general purpose personal computer capable of performing various functions by having various programs installed, and the like.

This recording medium, as shown in FIG. 5, may include not only packaged media, which include the magnetic disk 91 (including flexible disks), the optical disc 92 (including CD-ROM (Compact Disk-Read Only Memory) and DVD (Digital Versatile Disk)), the magneto-optical disc 93 (including MD (registered trademark) (Mini-Disk)) or the semiconductor memory 94 and the like on which programs are recorded, that are distributed separately from the apparatus itself in order to provide programs to the user, but may also include the ROM 82 in which programs are recorded, a hard disk included in the memory section 88 and the like and which are provided to the user in a state where they are pre-incorporated into the apparatus itself.

It is noted that, in the present description, the steps that describe the programs recorded on the recording medium naturally include processes performed chronologically in accordance with the order in which they are described, but they also include processes that are executed in parallel or individually, and not necessarily processed chronologically.

In addition, in the present description, the term system refers to an apparatus as a whole including a plurality of apparatuses.

According to the present invention, users are able to view contents stored in one information management apparatus from information processing apparatuses connected via a network.

In addition, according to the present invention, users are able to view contents efficiently and comfortably.

What is claimed is:

1. An information processing apparatus comprising:
a control device to:
store, in a memory, a time stamp representing a position of content when playing of the content is stopped, based on a first request over a network from a first apparatus to which the content is provided over the network, the first request indicating the position of the content and based on stopping of playing of the content at the first apparatus; and
provide, over the network, the content from the position represented by the time stamp, in response to a second request over the network for playing of the content from the position provided to the information processing apparatus subsequent to the first request,
wherein, when the second request is from a second apparatus, the content is provided to the second apparatus from the position represented by the time stamp, in which first user identification information is set at the second apparatus for automatically being included in the second request, and wherein the time stamp is stored in the memory with second user identification set at the first apparatus for automatically being included in the first request, and without an indication identifying the second apparatus as a source from which the second request is transmitted and an indication identifying the first apparatus as a source from which the first request is transmitted, and in which each of the first and second apparatuses is a unique device.

2. The information processing apparatus of claim 1, wherein the first request is based on a command input to the first apparatus by a user to cause the stopping of playing of the content.

3. The information processing apparatus of claim 2, wherein the command input represents stopping or pausing of playing of the content.

4. The information processing apparatus of claim 2, wherein the command input represents an instruction to play other content instead of the content.

5. The information processing apparatus of claim 1, wherein the control device stops providing of the content to the first apparatus based on the first request.

6. The information processing apparatus of claim 1, wherein the stopping of playing of the content at the first apparatus is when at least one of power of the first apparatus is forcibly turned off or a content player of the first apparatus is forcibly shut down.

7. An information processing apparatus comprising:
a control device to:
transmit, over a network, a first request to store a time stamp representing a position of content when playing of the content is stopped, the first request indicating the position of the content and based on stopping of playing of the content at the information processing apparatus; and
to play the content from the position represented by the time stamp, in accordance with a response over the network to a second request transmitted from the information processing apparatus over the network for playing of the content from the position, the second request being transmitted subsequent to the first request, in which user identification information is set at the information processing apparatus for automatically being included in the second request,
wherein the time stamp is stored in a memory of an external apparatus based on the first request with the user identification set at the information processing apparatus for automatically being included in the first request, and without an indication identifying of the information processing apparatus as a source from which the second request is transmitted and an indication identifying the information processing apparatus as a source from which the second request is transmitted.

8. The information processing apparatus of claim 7, wherein the information processing apparatus is a television, a personal digital assistant device, a computer or a mobile phone.

9. An information processing apparatus comprising:
a control device to:
transmit, over a network, a first request to play content from a position represented by a time stamp, wherein the time stamp represents a position of the content when playing of the content is stopped and is stored based on a second request transmitted over the network, wherein the second request is based on stopping of playing of the content at an apparatus other than the information processing apparatus, the first request being transmitted subsequent to the second request, in which first user identification information is set at the information processing apparatus for automatically being included in the first request; and
to play the content from the position represented by the time stamp, in accordance with a response over the network to the first request,
wherein the time stamp is stored in a memory of an external apparatus based on the second request with second user identification set at the other information processing apparatus for automatically being included in the second request, and without an indication identifying the information processing apparatus as a source from which the first request is transmitted and an indication identifying the other information processing apparatus as a source from which the second request is transmitted.

10. The information processing apparatus of claim 9, wherein each of the information processing apparatus and the other apparatus is a television, a personal digital assistant device, a computer or a mobile phone.

11. A system for managing information, the system comprising:
a first control device to store, in a memory, a time stamp representing a position of content when playing of the content is stopped, based on a first request over a network from a first apparatus to which the content is provided over the network, the first request indicating the position of the content and based on stopping of playing of the content at the first apparatus; and
a second control device to stop providing of the content based on the first request and to start providing the content over the network from the position represented by the time stamp, in response to a second request over the network for playing of the content from the position provided to the system subsequent to the first request,
wherein, when the second request is from a second apparatus, the content is provided to the second apparatus from the position represented by the time stamp, in which first user identification information is set at the second apparatus for automatically being included in the second request, and wherein the time stamp is stored in the memory with second user identification set at the first apparatus for automatically being included in the first request, and without an indication identifying of the second apparatus as a source from which the second request is transmitted and an indication identifying the first apparatus as a source from which the first request is transmitted, and in which each of the first and second apparatuses is a unique device.

12. An information processing apparatus comprising:
a control device to:
receive, over a network, a first request from a first apparatus to store a time stamp representing a position of content when playing of the content is stopped, the first request indicating the position of the content and based on stopping of playing of the content; and
to play the content from the position represented by the time stamp, in response to a second request transmitted over the network for playing of the content from the position, the second request being transmitted subsequent to the first request, wherein, when the second request is from a second apparatus, the content is played from the position represented by the time stamp, in which first user identification information is set at the second apparatus for automatically being included in the second request, and wherein the time stamp is stored in a memory with second user identification set at the first apparatus for automatically being included in the first request, and without an indication identifying the second apparatus as a source from which the second request is transmitted and an indication identifying the first apparatus as a source from which the first request is transmitted, and in which each of the first and second apparatuses is a unique device.

\* \* \* \* \*